US011354085B2

(12) United States Patent
Swaminathan et al.

(10) Patent No.: US 11,354,085 B2
(45) Date of Patent: Jun. 7, 2022

(54) PRIVACY ZONING AND AUTHORIZATION FOR AUDIO RENDERING

(71) Applicant: QUALCOMM Incorporated, San Diego, CA (US)

(72) Inventors: Siddhartha Goutham Swaminathan, San Diego, CA (US); Isaac Garcia Munoz, San Diego, CA (US); S M Akramus Salehin, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/918,386

(22) Filed: Jul. 1, 2020

(65) Prior Publication Data

US 2021/0004200 A1   Jan. 7, 2021

Related U.S. Application Data

(60) Provisional application No. 62/870,591, filed on Jul. 3, 2019.

(51) Int. Cl.
*G06F 3/16* (2006.01)
*H04N 21/43* (2011.01)
(Continued)

(52) U.S. Cl.
CPC ............. *G06F 3/165* (2013.01); *G06F 3/012* (2013.01); *H04N 21/4307* (2013.01); *H04N 21/4396* (2013.01); *H04N 21/8106* (2013.01)

(58) Field of Classification Search
CPC ..... G06F 3/165; G06F 3/012; H04N 21/4307; H04N 21/4396; H04N 21/8106
See application file for complete search history.

(56) References Cited

U.S. PATENT DOCUMENTS 8,700,406 B2   4/2014  Grokop et al.
8,863,008 B2   10/2014 Chan et al.
(Continued)

FOREIGN PATENT DOCUMENTS

WO      2018064528 A1    4/2018

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

(Continued)

*Primary Examiner* — Fan S Tsang
*Assistant Examiner* — David Siegel
(74) *Attorney, Agent, or Firm* — Shumaker & Sieffert, P.A.

(57) ABSTRACT

Example devices and methods are disclosed. An example device includes a memory configured to store a plurality of audio streams and an associated level of authorization for each of the plurality of audio streams. The device also includes one or more processors implemented in circuitry and communicatively coupled to the memory. The one or more processors are configured to select, based on the associated levels of authorization, a subset of the plurality of audio streams, the subset of the plurality of audio streams excluding at least one of the plurality of audio streams.

34 Claims, 25 Drawing Sheets

(51) Int. Cl.
*G06F 3/01* (2006.01)
*H04N 21/81* (2011.01)
*H04N 21/439* (2011.01)

(56) References Cited

U.S. PATENT DOCUMENTS

| | | | |
|---|---|---|---|
| 10,015,447 | B2 | 7/2018 | Mann et al. |
| 10,530,731 | B1* | 1/2020 | Wu ........................ H04L 51/046 |
| 10,540,521 | B2 | 1/2020 | Baracaldo Angel et al. |
| 2011/0249821 | A1 | 10/2011 | Jaillet et al. |
| 2014/0189518 | A1* | 7/2014 | Kim .................. H04M 1/72454 715/728 |
| 2016/0379660 | A1* | 12/2016 | Wright ................. H04R 29/008 381/57 |
| 2017/0017460 | A1 | 1/2017 | Tull |
| 2018/0206057 | A1 | 7/2018 | Kim et al. |
| 2018/0278835 | A1 | 9/2018 | Meganathan |
| 2019/0007781 | A1 | 1/2019 | Peters et al. |
| 2019/0198028 | A1 | 6/2019 | Kim et al. |
| 2020/0081682 | A1* | 3/2020 | Vestal ................. H04N 21/2187 |
| 2020/0260199 | A1* | 8/2020 | Burwinkel ............. H04R 27/00 |

OTHER PUBLICATIONS

ETSI TS 103 589 V1.1.1, "Higher Order Ambisonics (HOA) Transport Format", Jun. 2018, 33 pages.
Herre J., et al., "MPEG-H 3D Audio—The New Standard for Coding of Immersive Spatial Audio," IEEE Journal Of Selected Topics In Signal Processing, Aug. 1, 2015 (Aug. 1, 2015), vol. 9(5), pp. 770-779, XP055243182, US ISSN: 1932-4553, DOI: 10.1109/JSTSP.2015.2411578.
Hollerweger F., "An Introduction to Higher Order Ambisonic," Oct. 2008, pp. 13, Accessed online [Jul. 8, 2013].
"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.
"Information technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information technology—High efficiency coding and media delivery in heterogeneous environments—Part 3: Part 3 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.
ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Peterson J., et al., "Virtual Reality, Augmented Reality, and Mixed Reality Definitions," EMA, version 1.0, Jul. 7, 2017, 4 pp.
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.
Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), 4 Pages, XP030062477, figure 1.
Zheng X., "Soundfield Navigation Separation Compression and Transmission", University of Wollongong, 2013, 254 Pages.
International Search Report and Written Opinion—PCT/US2020/040702—ISA/EPO—dated Oct. 19, 2020, 16 pp.

* cited by examiner

PRIVACY ZONING AND AUTHORIZATION FOR AUDIO RENDERING

This application claims the benefit of U.S. Provisional Application No. 62/870,591, filed on Jul. 3, 2019, the entire contents of which is hereby incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems is generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture or synthesis and rendering of an acoustical space for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. An example of an outdoor environment could include a car, buildings, walls, a forest, etc. An acoustical space may be an example of an acoustical environment and may be an indoor space or an outdoor space. As used herein, an audio element is either a sound captured by a microphone (e.g., directly captured from near-field sources or reflections from far-field sources whether real or synthetic), or a sound field previously synthesized, or a mono sound synthesized from text to speech, or a reflection of a virtual sound from an object in the acoustic environment.

In one example, various aspects of the techniques are directed to a device including a memory configured to store the plurality of audio streams and an associated level of authorization for each of the plurality of audio streams; and one or more processors implemented in circuitry and communicatively coupled to the memory, and configured to: select, based on the associated levels of authorization, a subset of the plurality of audio streams, the subset of the plurality of audio streams excluding at least one of the plurality of audio streams.

In another example, various aspects of the techniques are directed to a method including: storing, by a memory, a plurality of audio streams and an associated level of authorization for each of the plurality of audio streams; and selecting, by one or more processors and based on the associated levels of authorization, a subset of the plurality of audio streams, the subset of the plurality of audio streams excluding at least one of the plurality of audio streams.

In another example, various aspects of the techniques are directed to a device including: means for storing the plurality of audio streams and an associated level of authorization for each of the plurality of audio streams; and means for selecting, based on the associated levels of authorization, a subset of the plurality of audio streams, the subset of the plurality of audio streams excluding at least one of the plurality of audio streams.

In another example, various aspects of the techniques are directed to a non-transitory computer-readable storage medium having stored thereon instructions that, when executed, cause one or more processors to: store the plurality of audio streams and an associated level of authorization for each of the plurality of audio streams; and select, based on the associated levels of authorization, a subset of the plurality of audio streams, the subset of the plurality of audio streams excluding at least one of the plurality of audio streams.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
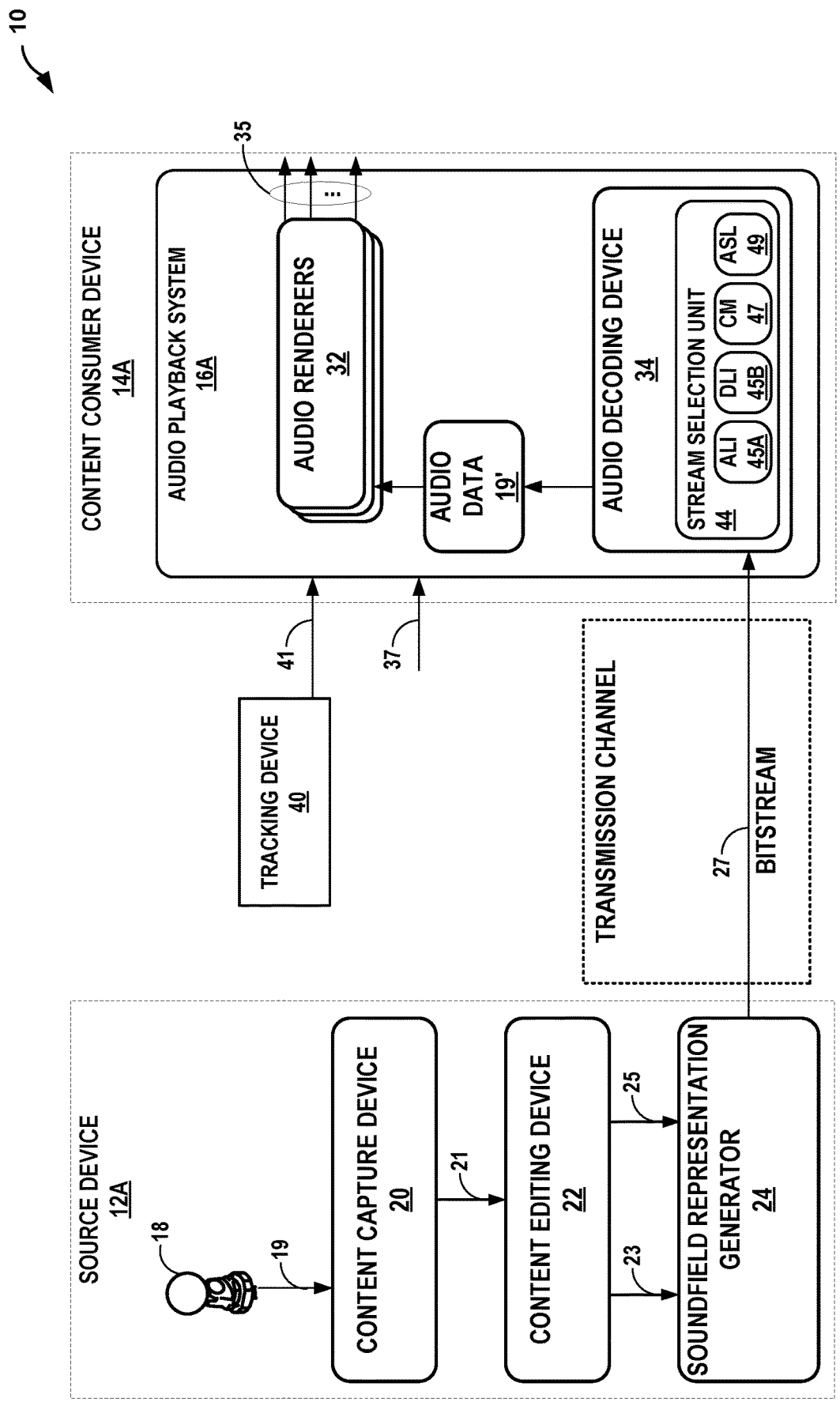
FIGS. 1A-1C are diagrams illustrating systems that may perform various aspects of the techniques described in this disclosure.

When an audio scene is rendered with many audio sources which may be obtained by audio capture devices in a live scene, or which may be synthesized, certain zones may contain audio sources that may include sensitive information for which access should be restricted. According to the techniques of this disclosure, a subset of a plurality of audio streams is selected based on an associated level of authorization for each of the plurality of audio streams. In some examples, one or more of the plurality of audio streams are associated with at least one privacy zone. In some examples, the gain of one or more of the subset of the plurality of audio streams may be changed based on the associated levels of authorization. In some examples, excluded audio streams may be nulled.

The techniques of this disclosure may provide the ability to protect sensitive information when rendering an audio scene with many audio sources. In some examples, the techniques of this disclosure may provide the ability to protect sensitive information on the rending side when the capturing side cannot restrict access to audio streams containing sensitive information.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include location information (e.g., metadata) identifying a location of the audio object relative to a listener or other point of reference in the soundfield, such that the audio object may be rendered to one or more speaker channels for playback in an effort to recreate the soundfield. The techniques described in this disclosure may apply to any of the following formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi \sum_{n=0}^{\infty} j_n(kr_r) \sum_{m=-n}^{n} A_n^m(k) Y_n^m(\theta_r, \varphi_r)\right]e^{j\omega t},$$

The expression shows that the pressure pi at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (e.g., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k)h_n^{(2)}(kr_s)Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of three dimensional (3D) coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate 3D localization of sound sources within the soundfield. As such, XR devices may render the ambisonic coefficients to speaker feeds that, when played via one or more speakers or headphones, accurately reproduce the soundfield.

As another example, the ambisonic coefficients may be translated or rotated to account for user movement without overly complex mathematical operations, thereby potentially accommodating the low latency requirements of XR devices. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR devices may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the acoustical space via a screen, which may be mounted to the head of the user or viewed as would be done when normally using the mobile device. As such, any information on the screen can be part of the mobile device. The mobile device may be able to provide tracking information and thereby allow for both a VR experience (when head mounted) and a normal experience to view the acoustical space, where the normal experience may still allow the user to view the acoustical space providing a VR-lite-type experience (e.g., holding up the device and rotating or translating the device to view different portions of the acoustical space).

Figure 1B:
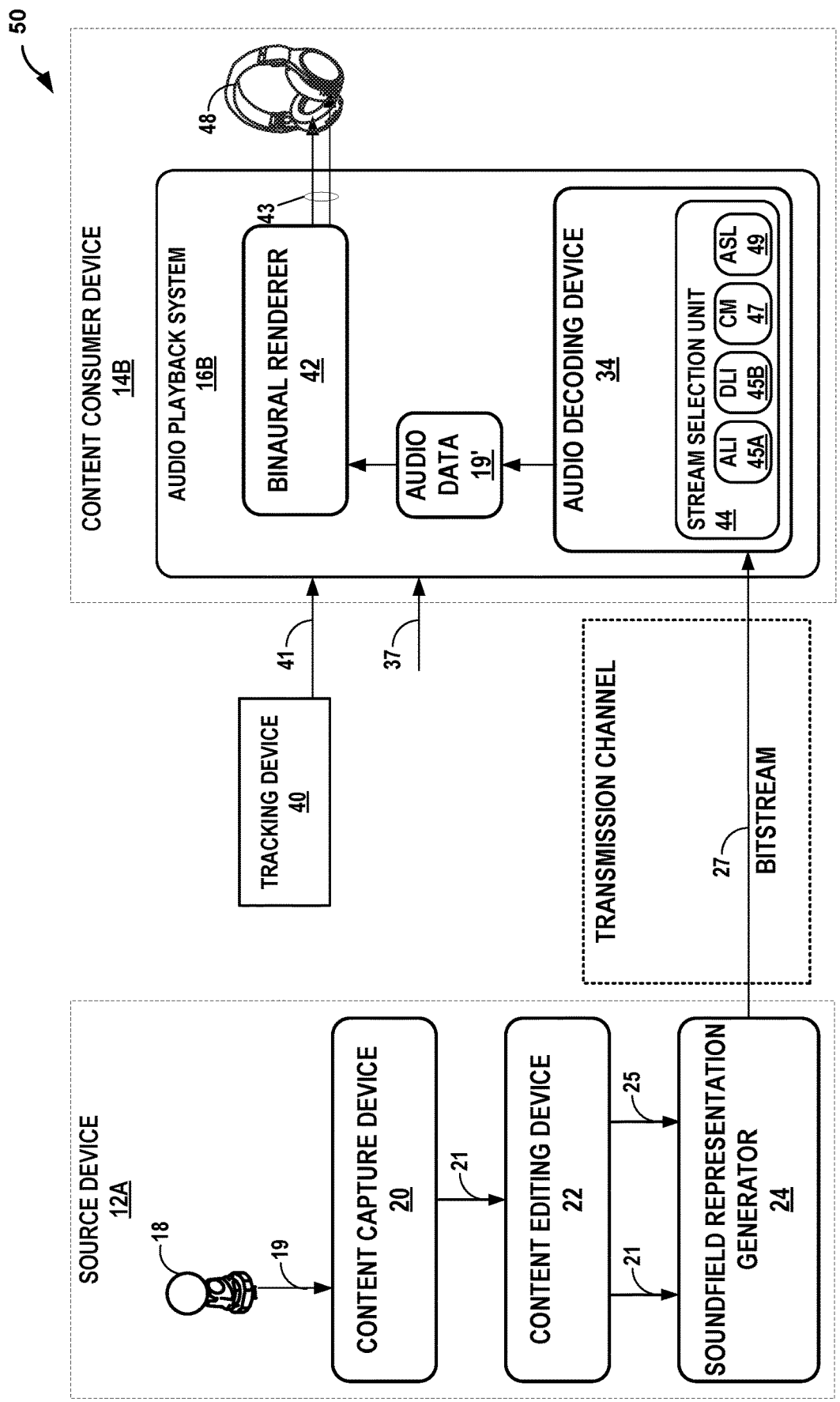
Figure 1C:
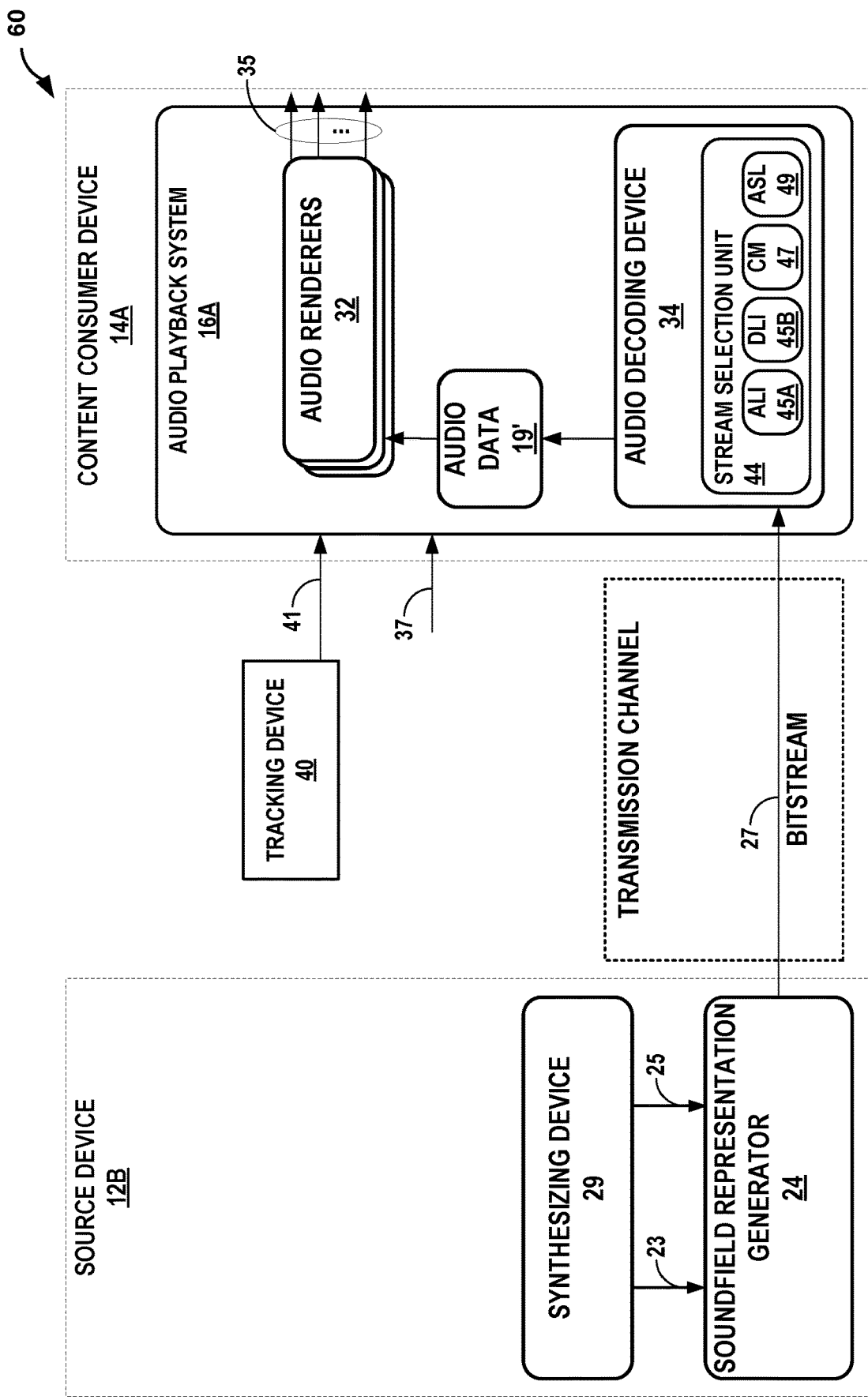

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data. Moreover, the source device 12A may represent any form of computing device capable of generating the representation of a soundfield, and is generally described herein in the context of being a VR content creator device. Likewise, the content consumer device 14A may represent any form of computing device capable of implementing rendering techniques described in this disclosure as well as audio playback, and is generally described herein in the context of being a VR client device.

The source device 12A may be operated by an entertainment company or other entity that may generate mono and/or multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19. Audio data 19 may represent an audio stream or include an audio stream.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter content 21 received from content capture device 20, including the audio data 19. The content editing device 22 may output edited content 23 and associated information (e.g., metadata) 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and information (e.g., metadata) 25, provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield and the information (e.g., metadata) 25.

For instance, to generate the different representations of the soundfield using ambisonic coefficients (which again is one example of the audio data 19), soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER- MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 or the content editing device 22 and the soundfield representation generator 24, the content capture device 20 or the content editing device 22 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA) or other standard.

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or first order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, such as a Wi-Fi channel, a Bluetooth channel or a channel conforming to a $5^{th}$ generation (5G) cellular standard, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14A may be operated by an individual, and may represent a VR client device. Although described with respect to a VR client device, content consumer device 14A may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14A. As shown in the example of FIG. 1A, the content consumer device 14A includes an audio playback system 16A, which may refer to any form of audio playback system capable of rendering the audio data for playback as mono and/or multi-channel audio content.

While shown in FIG. 1A as being directly transmitted to the content consumer device 14A, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may include a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14A, requesting the bitstream 27.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14A includes the audio playback system 16A. The audio playback system 16A may represent any system capable of playing back mono and/or multi-channel audio data. The audio playback system 16A may include a number of different audio renderers 32. The audio renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or "both A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data. Audio data 19' may include an audio stream or a representation of an audio stream.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19, but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data, or channel-based audio. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers or headphones (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers or headphones may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translational movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 (in audio playback system 16B of content consumer device 14B) capable of performing binaural rendering using one or more head-related transfer functions (HRTFs) or the other functions capable of rendering to left and right speaker feeds 43.

The audio playback system 16B may output the left and right speaker feeds 43 to headphones 48, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

FIG. 1C is a block diagram illustrating another example system 60. The example system 60 is similar to the example system 10 of FIG. 1A, but source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
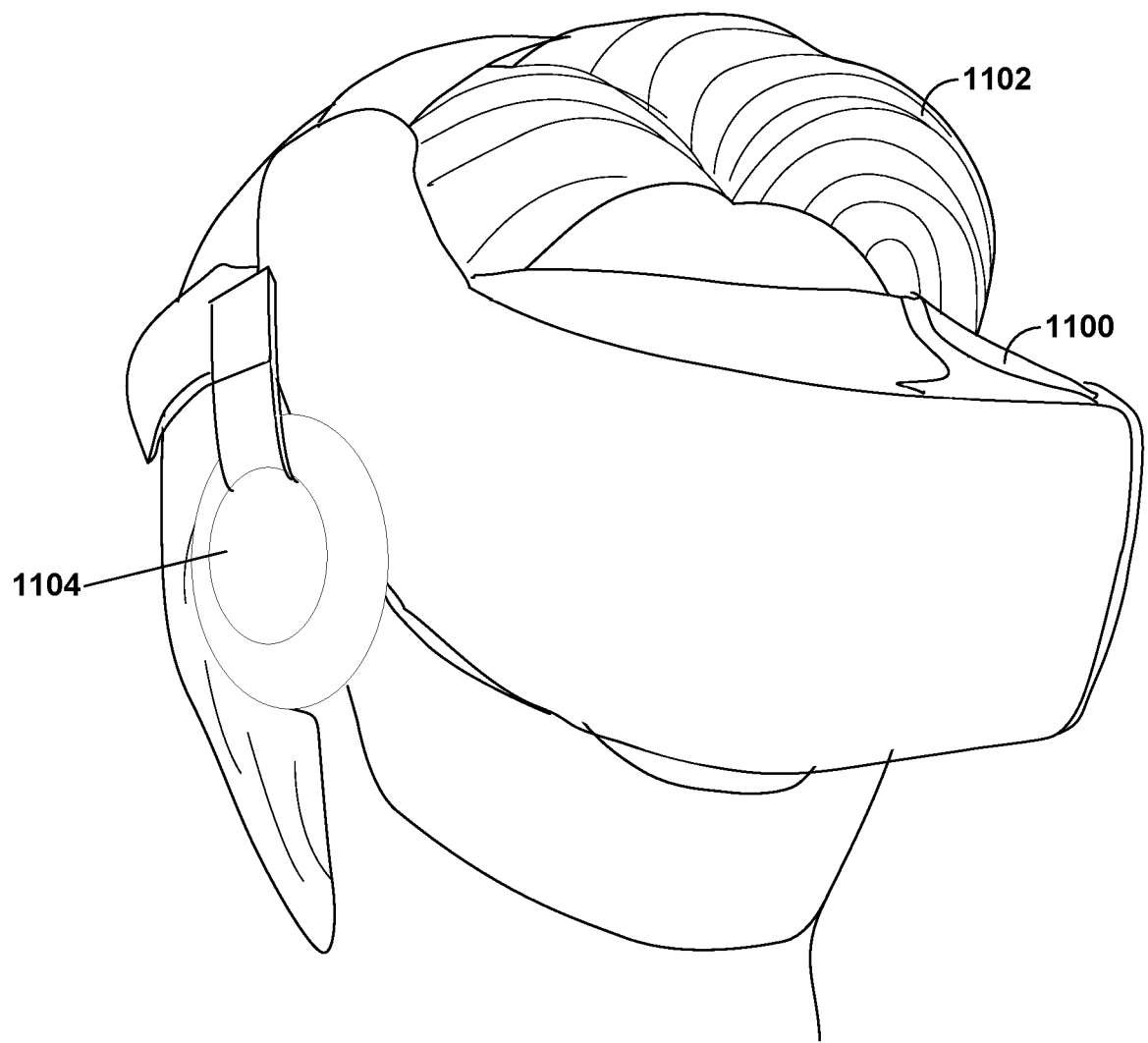
FIG. 2 is a diagram illustrating an example of a VR device worn by a user.

As described above, the content consumer device 14A or 14B (either of which may be hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 1100 worn by a user 1102. The VR device 1100 is coupled to, or otherwise includes, headphones 1104, which may reproduce a soundfield represented by the audio data 19' through playback of the speaker feeds 35.

The speaker feeds 35 may represent an analog or digital signal capable of causing a membrane within the transducers of headphones 1104 to vibrate at various frequencies, where such process is commonly referred to as driving the headphones 1104.

Video, audio, and other sensory data may play important roles in the VR experience. To participate in a VR experience, the user 1102 may wear the VR device 1100 (which may also be referred to as a VR client device 1100) or other wearable electronic device. The VR client device (such as the VR device 1100) may include a tracking device (e.g., the tracking device 40) that is configured to track head movement of the user 1102, and adapt the video data shown via the VR device 1100 to account for the head movements, providing an immersive experience in which the user 1102 may experience an acoustical space shown in the video data in visual three dimensions. The acoustical space may refer to a virtual world (in which all of the world is simulated), an augmented world (in which portions of the world are augmented by virtual objects), or a physical world (in which a real world image is virtually navigated).

While VR (and other forms of AR and/or MR) may allow the user 1102 to reside in the virtual world visually, often the VR device 1100 may lack the capability to place the user in the acoustical space audibly. In other words, the VR system (which may include a computer responsible for rendering the video data and audio data—that is not shown in the example of FIG. 2 for ease of illustration purposes, and the VR device 1100) may be unable to support full three-dimension immersion audibly (and in some instances realistically in a manner that reflects the displayed scene presented to the user via the VR device 1100).

While described in this disclosure with respect to the VR device, various aspects of the techniques may be performed in the context of other devices, such as a mobile device. In this instance, the mobile device (such as a so-called smartphone) may present the acoustical space via a screen, which may be mounted to the head of the user 1102 or viewed as would be done when normally using the mobile device. As such, any information on the screen can be part of the mobile device. The mobile device may be able to provide tracking information 41 and thereby allow for both a VR experience (when head mounted) and a normal experience to view the acoustical space, where the normal experience may still allow the user to view the acoustical space providing a VR-lite-type experience (e.g., holding up the device and rotating or translating the device to view different portions of the acoustical space).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which may hereinafter referred to as source device 12) may stream content 21, where the source devices 12 may have widely different capabilities. For example, one source device 12 may be a smartphone with a digital fixed-lens camera and one or more microphones, while another source device may be production level television equipment capable of obtaining video of a much higher resolution and quality than the smartphone. However, all of the source devices 12, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and microphones, privacy may become an issue, as users may not want to live streams fully available to the public.

In the context of streaming application (live or recorded), there may be a large number of audio streams associated with varying levels of quality and/or content. The audio streams may represent any type of audio data, including scene-based audio data (e.g., ambisonic audio data, including FOA audio data, MOA audio data and/or HOA audio data), channel-based audio data, and object-based audio data. Selecting only one of a potentially large number of audio streams from which to recreate a soundfield may not provide an experience that ensures an adequate level of immersion. However, selecting multiple audio streams may create distractions due to different spatial localization between the multiple audio streams, thereby potentially reducing immersion.

In accordance with the techniques described in this disclosure, the audio decoding device 34 may adaptively select between audio streams available via the bitstream 27 (which are represented by the bitstream 27 and hence the bitstream 27 may be referred to as "audio streams 27"). The audio decoding device 34 may select between different audio streams of the audio streams 27 based on audio location information (ALI) (e.g., 45A in FIGS. 1A-1C), which in some examples may be included as metadata accompanying the audio streams 27, where the audio location information may define capture coordinates in the acoustical space for the microphones that capture the respective audio streams 27 or virtual capture coordinates in the acoustical space for synthesized audio streams. The ALI 45A may be representative of a location in an acoustical space at which the corresponding one of the audio streams 27 was captured or synthesized. The audio decoding device 34 may select, based on the ALI 45A, a subset of the audio streams 27, where the subset of the audio streams 27 excludes at least one of the audio streams 27. The audio decoding device 34 may output the subset of audio streams 27 as audio data 19'.

In addition, the audio decoding device 34 may obtain the tracking information 41, which the content consumer device 14 may translate into device location information (DLI)(e.g., 45B in FIGS. 1A-1C). The DLI 45B may represent a virtual or actual location of the content consumer device 14 in the acoustical space, which may be defined as one or more device coordinates in the acoustical space. The content consumer device 14 may provide the DLI 45B to the audio decoding device 34. The audio decoding device 34 may then select, based on the ALI 45A and the DLI 45B, the audio data 19' from the audio streams 27. The audio playback system 16A or 16B may then reproduce, based on the audio data 19', the corresponding soundfields.

In this respect, the audio decoding device 34 may adaptively select a subset of the audio streams 27 to obtain the audio data 19' that may result in a more immersive experience (compared to selecting a single audio stream or all of the audio data 19'). As such, various aspects of the techniques described in this disclosure may improve operation of the audio decoding device 34 (and the audio playback system 16A or 16B and the content consumer device 14) itself by possibly enabling the audio decoding device 34 to better spatialize sound sources within the soundfield and thereby improve immersion.

In operation, the audio decoding device 34 may interface with one or more source devices 12 to determine the ALI 45A for each of the audio streams 27. As shown in the example of FIG. 1A, the audio decoding device 34 may include a stream selection unit 44, which may represent a unit configured to perform various aspects of the audio stream selection techniques described in this disclosure.

The stream selection unit 44 may generate, based on the ALI 45A, a constellation map (CM) 47. The CM 47 may define the ALI 45A for each of the audio streams 27. The stream selection unit 44 may also perform an energy analysis with respect to each of the audio streams 27 to determine an energy map for each of the audio streams 27, storing the energy map along with the ALI 45A in the CM 47. The energy maps may jointly define an energy of a common soundfield represented by the audio streams 27.

The stream selection unit 44 may next determine distance(s) between the device location represented by the DLI 45B and the capture location(s) or synthesis location(s) represented by the ALI 45A associated with at least one (and possibly each) of the audio streams 27. The stream selection unit 44 may then select, based on the distance(s), the audio data 19' from the audio streams 27 as discussed in more detail below with respect to FIGS. 3A-3E.

Further, in some examples, the stream selection unit 44 may also select, based on the energy maps stored to the CM 47, the ALI 45A, and the DLI 45B (jointly where the ALI 45A and the DLI 45B are presented in the form of the above noted distances, which may also be referred to as "relative distances"), the audio data 19' from the audio streams 27. For example, the stream selection unit 44 may analyze the energy maps presented in the CM 47 to determine an audio source location (ASL) 49 of an audio source in the common soundfield emitting sound that is captured by microphones (such as the microphone 18) or synthesized (such as by synthesizing device 29) and represented by the audio streams 27. The stream selection unit 44 may then determine, based on ALI 45A, the DLI 45B, and the ASL 49, the audio data 19' from the audio streams 27. More information regarding how the stream selection unit 44 may select the streams is discussed below with respect to FIGS. 3A-3E.

Figure 3A:
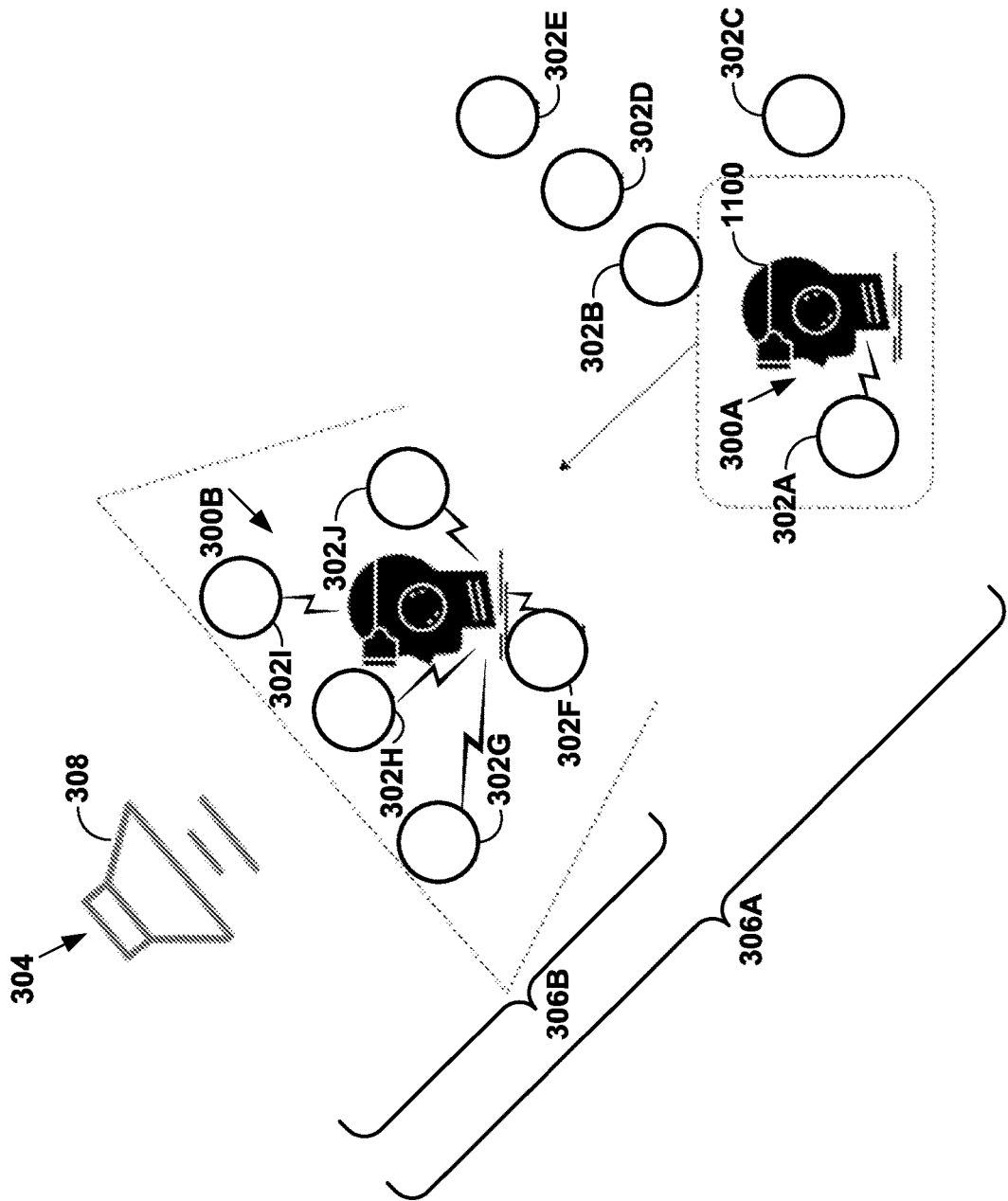
FIGS. 3A-3E are diagrams illustrating, in more detail, example operation of the stream selection unit shown in the examples of FIGS. 1A-1C.

FIGS. 3A-3E are diagrams illustrating, in more detail, example operation of the stream selection unit 44 shown in the example of FIG. 1A. As shown in the example of FIG. 3A, the stream selection unit 44 may determine that the DLI 45B indicates that the content consumer device 14 (shown as the VR device 1100) is at virtual location 300A. The stream selection unit 44 may next determine the ALI 45A for one or more of audio elements 302A-302J (collectively referred to as audio elements 302) which may represent not just microphones, such as the microphone 18 shown in FIG. 1A, but other types of capture devices, including other XR devices, mobile phones—including so-called smartphones—and the like, or synthesized soundfield, etc.).

As described above, the stream selection unit 44 may obtain the audio streams 27. The stream selection unit 44 may interface with audio elements 302A-302J to obtain the audio streams 27. In some examples, the stream selection unit 44 may interact with an interface (such as a receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIGS. 3A-3E and 4E-4H, where the selected audio data 19' is shown as being communicated from the selected one or more of the audio elements 302 to the VR device 1100.

In any event, the stream selection unit 44 may next obtain energy maps in the manner described above, analyzing the energy maps to determine the audio source location 304, which may represent one example of the ASL 49 shown in the example of FIG. 1A. The energy maps may denote audio source location 304 as the energy at the audio source location 304 may be higher than the surrounding area. Given that each of the energy maps may denote this higher energy, the stream selection unit 44 may triangulate, based on the higher energy in the energy maps, the audio source location 304.

Next, the stream selection unit 44 may determine an audio source distance 306A as a distance between the audio source location 304 and the virtual location 300A of the VR device 1100. The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user 1102.

In any event, the stream selection unit 44 may select, when the audio source distance 306A is greater than the audio source distance threshold (which is assumed in this example for purposes of illustration), a single audio stream of the audio streams 27 of the audio elements 302A-302J ("audio elements 302"). The stream selection unit 44 may output the corresponding one of the audio streams 27, which the audio decoding device 34 may decode and output as the audio data 19'.

Assuming that the user 1102 moves from the virtual location 300A to the virtual location 300B, the stream selection unit 44 may determine an audio source distance 306B as a distance between the audio source location 304 and the virtual location 300B. In some examples, the stream selection unit 44 may only update after some configurable release time, which may refer to a time after the listener stops moving.

In any event, the stream selection unit 44 may again compare the audio source distance 306B to the audio source distance threshold. The stream selection unit 44 may select, when the audio source distance 306B is less than or equal to the audio source distance threshold (which is assumed in this example for purposes of illustration), multiple audio streams of the audio streams 27 of the audio elements 302A-302J ("audio elements 302"). The stream selection unit 44 may output the corresponding ones of the audio streams 27, which the audio decoding device 34 may decode and output as the audio data 19'.

The stream selection unit 44 may also determine one or more proximity distances between the virtual location 300A and one or more (and possibly each) of the capture locations (or synthesis locations) represented by the ALI. The stream selection unit 44 may then compare the one or more proximity distances to a threshold proximity distance. The stream selection unit 44 may select, when the one or more proximity distances are greater than the threshold proximity distance, a smaller number of the audio streams 27 compared to when the one or more proximity distances are less than or equal to the threshold proximity distance to obtain the audio data 19'. However, the stream selection unit 44 may select, when the one or more of the proximity distances are less than or equal to the threshold proximity distance, a larger number of the audio streams 27 compared to when the proximity distance is greater than the threshold proximity distance to obtain the audio data 19'.

In other words, the stream selection unit 44 may attempt to select those of the audio streams 27 such that the audio data 19' are most closely aligned to the virtual location 300B and surround the virtual location 300B. The proximity distance threshold may define such a threshold, which the user 1102 of the VR headset 1100 may set or the stream selection unit 44 may again determine dynamically based on a quality of the audio elements 302F-302J, the gain or loudness of the audio source 308, tracking information 41 (e.g., to determine whether the user 1102 is facing the audio source 308), or any other factors.

In this respect, the stream selection unit 44 may increase audio spatialization accuracy when the listener is at the location 300B. Furthermore, when the listener is at the location 300A, the stream selection unit 44 may reduce a bitrate, as only the audio stream of audio element 302A is used to reproduce the soundfield rather than multiple audio streams of audio elements 302B-302J.

Figure 3B:
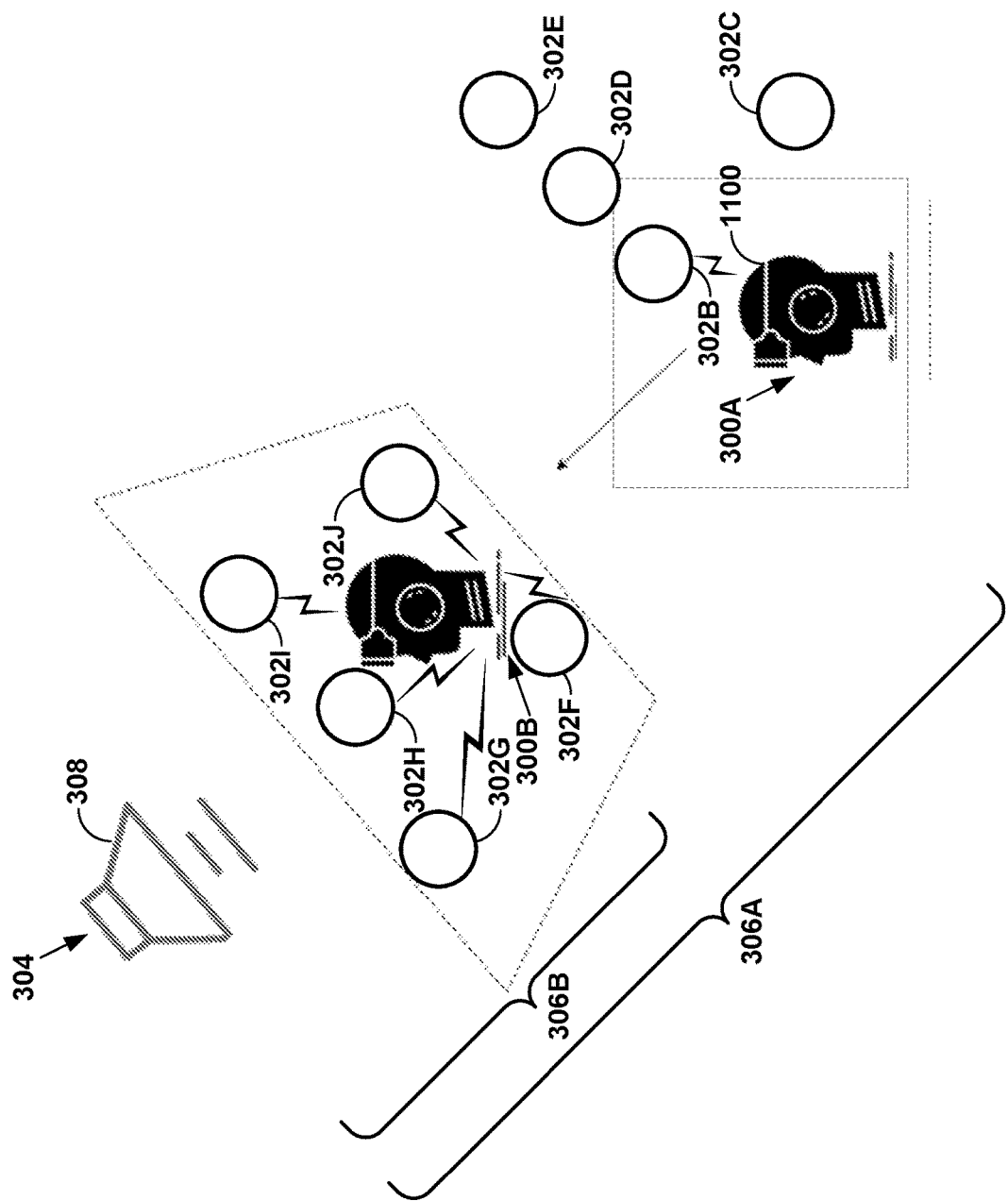

Referring next to the example of FIG. 3B, the stream selection unit 44 may determine that the audio stream of the audio element 302A is corrupted, noisy, or unavailable. The stream selection unit 44 may remove the audio stream from the CM 47 and reiterate through the audio streams 27 in accordance with the techniques described in more detail above to select a single one of the audio streams 27 (e.g., the audio stream of the audio element 302B in the example of FIG. 3B) given that the audio source distance 306A is greater than the audio source distance threshold.

Figure 3C:
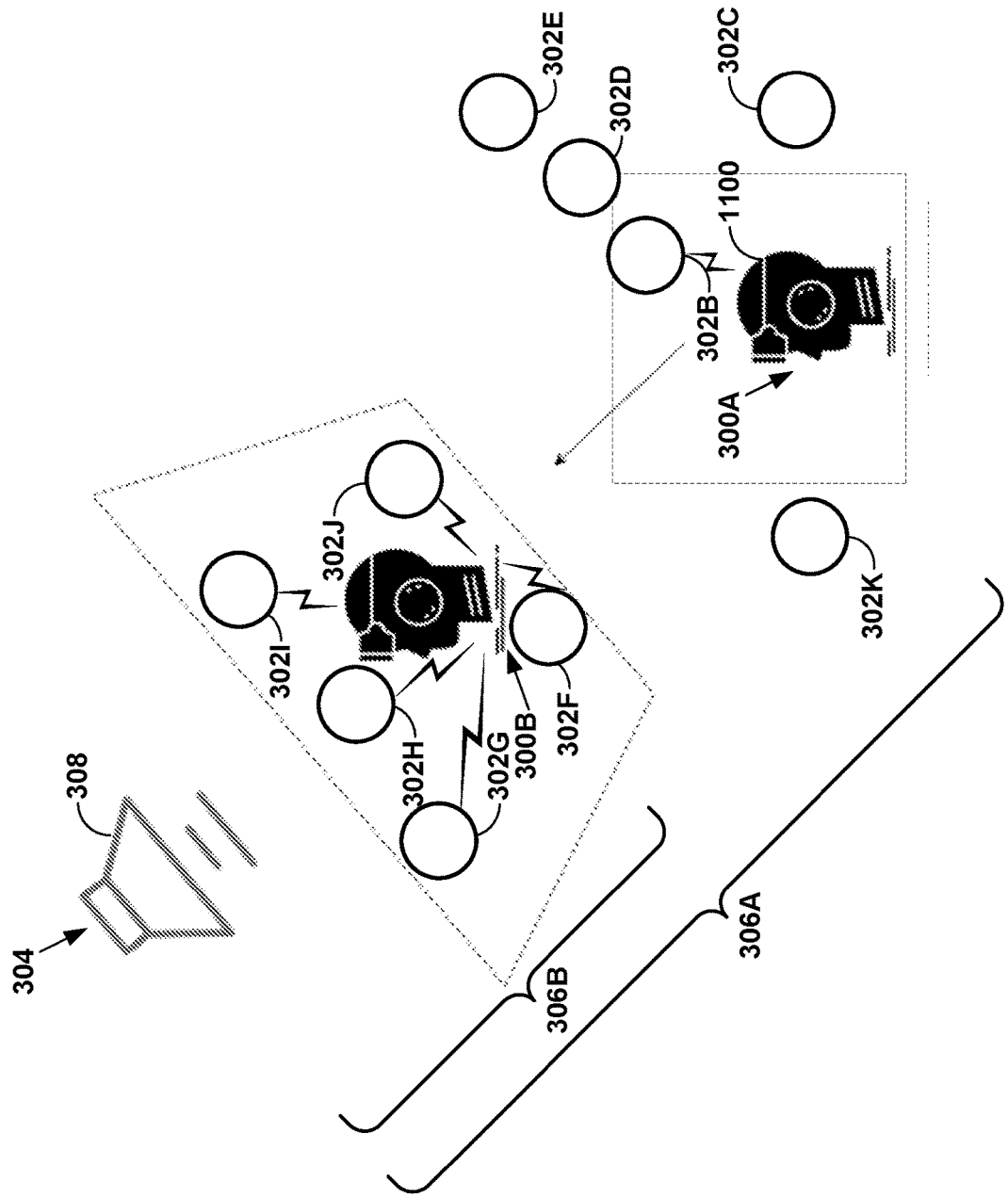

Referring next to the example of FIG. 3C, the stream selection unit 44 may obtain a new audio stream (the audio stream of the audio element 302K) and corresponding new information (e.g., metadata) that includes ALI 45A. The stream selection unit 44 may add the new audio stream to the CM 47 representative of the audio streams 27. The stream selection unit 44 may then reiterate through the audio streams 27 in accordance with the techniques described in more detail above to select a single one of the audio streams 27 (e.g., the audio stream of the audio element 302B in the example of FIG. 3C) given that the audio source distance 306A is greater than the audio source distance threshold.

Figure 3D:
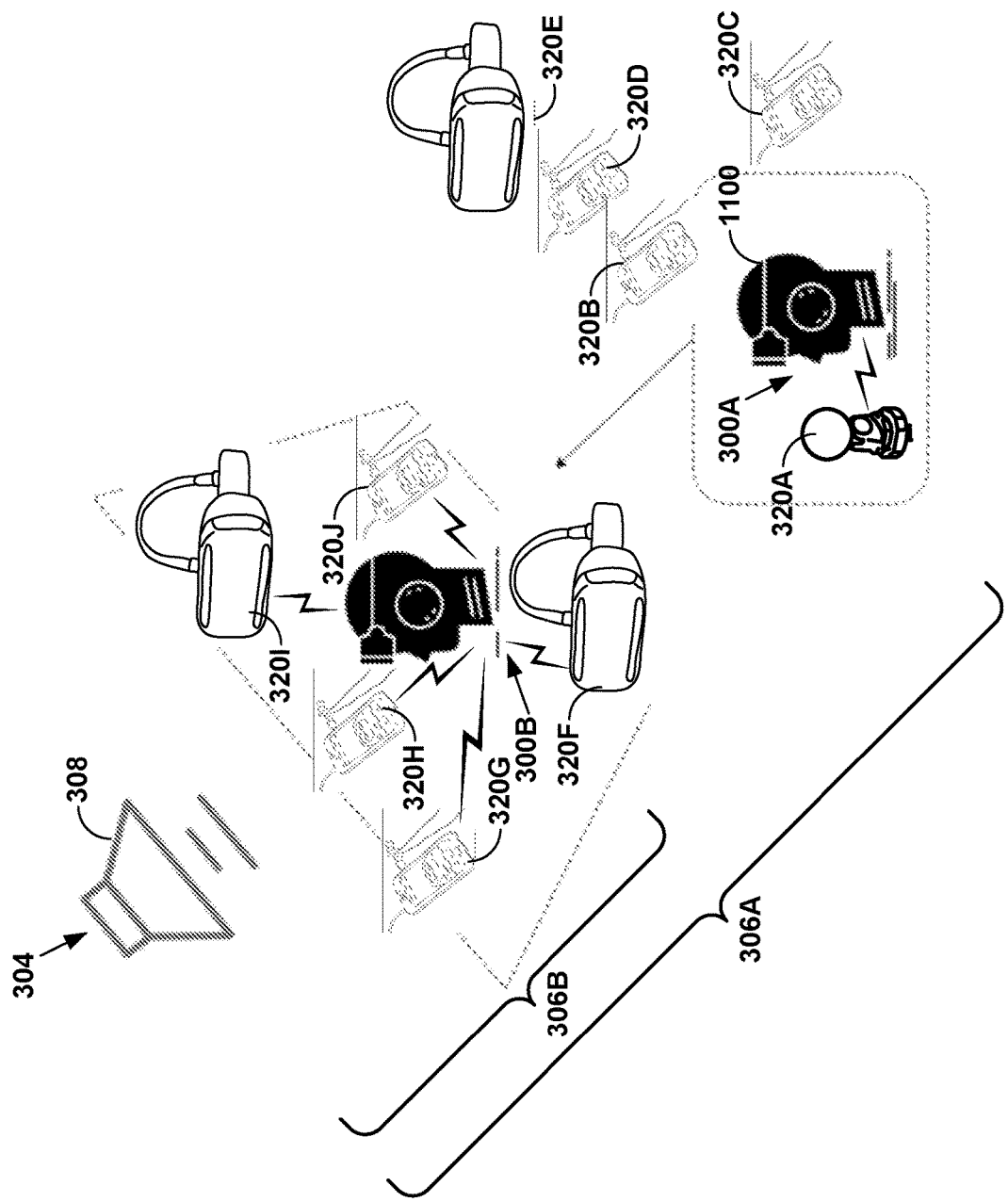

In the example of FIG. 3D, the audio elements 302 are replaced with specific example devices 320A-320J ("devices 320"), where device 320A represents a dedicated microphone 320A, while devices 320B, 320C, 320D, 320G, 320H, and 320J represent smartphones. The devices 320E, 320F, and 320I may represent VR devices. Each of devices 320 may include microphones, which capture audio streams 27 that are to be selected in accordance with various aspects of the stream selection techniques described in this disclosure.

In many contexts, there are audio streams that may be inappropriate or offensive for some people. For example, at a live sporting event, there may be people using offensive language in the venue. The same may be true in some video games. At other live events, like a convention, there may be sensitive discussions occurring. With the use of levels of authorization, the stream selection unit 44 may screen out or otherwise exclude the undesired or sensitive audio streams from the playback to the user of the content consumer device 14. The levels of authorization may be associated with individual audio streams or with privacy zones (discussed in more detail with respect to FIG. 4C).

The levels of authorization may take on several different forms. For example, the levels of authorization may be similar to the Motion Picture Association of America (MPAA) ratings or they may be similar to security clearances.

Another way to implement levels of authorization may be based on a contact list. This contact list may contain a plurality of contacts and may also contain a favorability rank or favorability ranking for one or more of the contacts. One or more processors may store the contact list in memory within the content consumer device 14. In this example, if a content creator or source of content is within a contact list (e.g., a person listed in the content list) on the content consumer device 14, the level of authorization is met. If not, the level of authorization is not met. In another example, the level of authorization may be based on a rank. For example, authorization may occur when the contact has at least a predetermined favorability rank or favorability ranking.

In some cases, the source device 12 may set the levels of authorization. For example, at a convention where sensitive discussions are going on, the content creator or source may create and apply a level of authorization so that only certain people with the appropriate privileges are able to hear that information. For other people without the appropriate privileges, the stream selection unit 44 may screen out or otherwise exclude the audio stream(s) for the discussions.

In other cases, such as the sporting event example, the content consumer device 14 may create the levels of authorization. As such, a user may exclude the offensive language during audio playback.

Figure 3E:
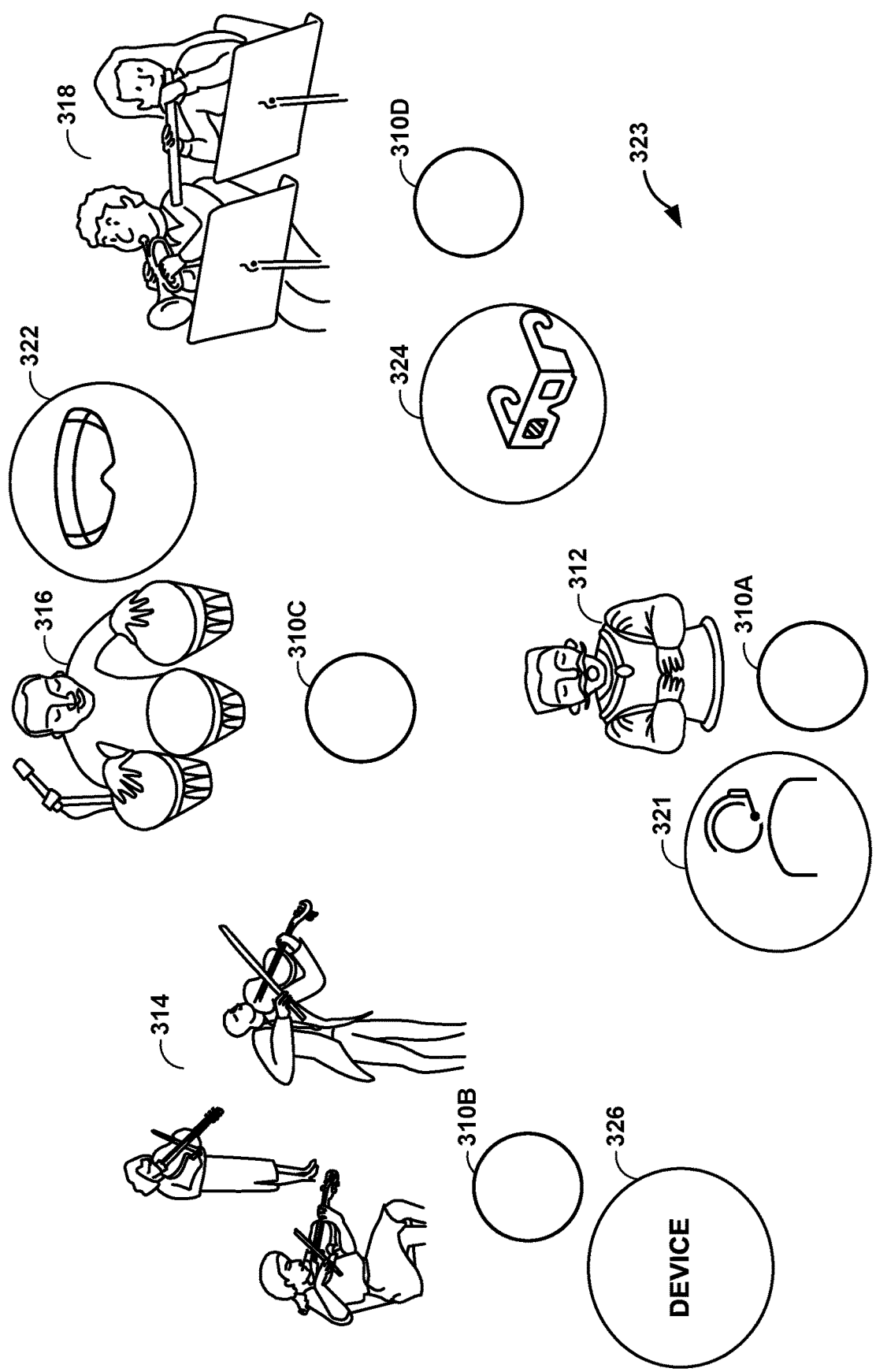

FIG. 3E is a conceptual diagram illustrating an example concert with three or more audio elements. In the example of FIG. 3E, a number of musicians are depicted on stage 323. Singer 312 is positioned behind audio element 310A. A string section 314 is depicted behind audio element 310B. Drummer 316 is depicted behind audio element 310C. Other musicians 318 are depicted behind audio element 310D. Audio elements 310A-301D may include audio streams that correspond to the sounds received by microphones. In some examples, audio elements 310A-310D may represent synthesized audio streams. For example, audio element 310A may represent an audio stream(s) primarily associated with singer 312, but the audio stream(s) may also include sounds produced by other band members, such as the string section 314, the drummer 316 or the other musicians 318, while the audio element 310B may represent an audio stream(s) primarily associated with string section 314, but also sounds produced by other band members. In this manner, each of audio elements 310A-310D, may represent a different audio stream(s).

Also depicted are a number of devices. These devices represent user devices located at a number of different listening positions. Headphones 321 are positioned near audio element 310A, but between audio element 310A and audio element 310B. As such, according to the techniques of this disclosure, stream selection unit 44 may select at least one of the audio streams to produce an audio experience for the user of the headphones 321 similar to the user being located where the headphones 321 are located in FIG. 3E. Similarly, VR goggles 322 are shown located behind the audio element 310C and between the drummer 316 and the other musicians 318. The stream selection unit 44 may select at least one audio stream to produce an audio experience for the user of the VR goggles 322 similar to the user being located where the VR goggles 322 are located in FIG. 3E.

Smart glasses 324 are shown located fairly centrally between the audio elements 310A, 310C and 310D. The stream selection unit 44 may select at least one audio stream to produce an audio experience for the user of the smart glasses 324 similar to the user being located where the smart glasses 324 are located in FIG. 3E. Additionally, device 326 (which may represent any device capable of implementing the techniques of this disclosure, such as a mobile handset, a speaker array, headphones, VR goggles, smart glasses, etc.) is shown located in front of audio element 310B. Stream selection unit 44 may select at least one audio stream to produce an audio experience for the user of the device 326 similar to the user being located where the device 325 is located in FIG. 3E. While specific devices are discussed with respect to particular locations, any of the devices depicted may provide an indication of a desired listening position that is different than depicted in FIG. 3E.

Figure 4A:
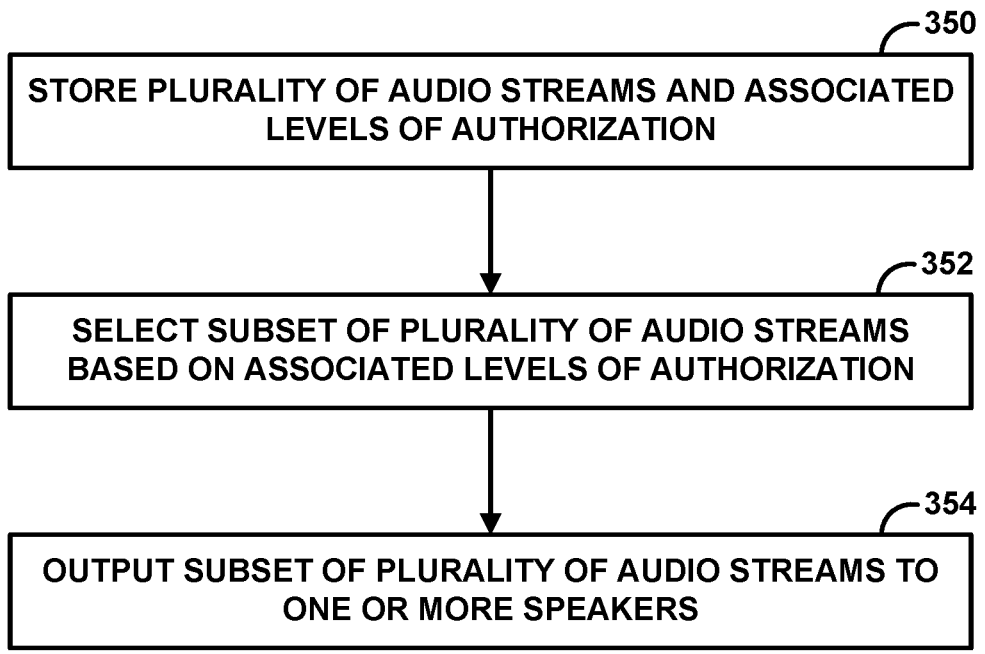
FIGS. 4A and 4B are flowcharts illustrating examples of the operations of the stream selection unit shown in the examples of FIGS. 1A-1C in performing various aspects of the stream selection techniques.

FIG. 4A is a flowchart illustrating an example of the operations of the stream selection unit shown in the examples of FIGS. 1A-1C according to the techniques of this disclosure. One or more processors of content consumer device 14 may store a plurality of audio streams and an associated level of authorization for each of the audio streams (350) in memory on content consumer device 14. For example, an audio stream may have an associated level of authorization. In some examples, a level of authorization may be directly associated with the audio stream. In some examples, the level of authorization may be associated with a privacy zone that is associated with the audio stream, and in this manner the audio stream is associated with the level of authorization. In some examples, the plurality of audio streams are stored in an encoded form. In other examples, the plurality of audio streams are stored in a decoded form.

In some examples, the level of authorization for an audio stream is based on location information associated with the audio stream. For example, audio decoding device 34 may store, in memory, location information associated with the coordinates of an acoustical space in which a corresponding one of the plurality of audio streams was captured or synthesized. The level of authorization for each of the plurality of audio streams may be determined based on the location information. In some examples, a plurality of privacy zones may be defined in the acoustical space. Each privacy zone may have an associated level of authorization. In some examples, the level of authorization for at least one of the plurality of audio streams may be determined based on the level of authorization of the privacy zone which contains the location at which the at least one of the plurality of audio streams was captured or synthesized. In some examples, the level of authorization for the at least one of the plurality of audio streams equals the level of authorization of the privacy zone which contains the location at which the one of the plurality of audio streams was captured or synthesized.

The one or more processors of content consumer device 14 may select a subset of the plurality of audio streams based on the associated levels of authorization in a manner that excludes at least one of the plurality of audio streams (352). In some examples, the excluded streams are associated with one or more privacy zones. For example, user 1102 may not have authorization to hear audio sources in one or more privacy zones and the one or more processors of the stream selection unit 44 may exclude those audio streams from the subset of the plurality of audio streams. In some examples, the one or more processors of the stream selection unit may exclude the audio streams from the subset of the plurality of audio streams by nulling the excluded audio streams.

The one or more processors of the stream selection unit 44 may output the subset of the plurality of audio streams to one or more speakers or headphones (354). For example, the one or more processors of the stream selection unit 44 may output the subset of the plurality of audio streams to headphones 48.

In some examples, the content consumer device 14 may receive a level of authorization from the source device 12. For example, the level of authorization may be contained in metadata associated with an audio stream or may be otherwise in bitstream 27. In other examples, one or more processors of the content consumer device may generate a level of authorization. In some examples, the one or more processors of the stream selection unit 44 may compare the level of authorization associated with each audio stream and a level of authorization for the device or a user of the device (e.g., user 1102) and select the subset of the plurality of audio streams based on the comparison of the level of authorization associated with each audio stream and a level of authorization for the device or a user of the device. In some examples, the levels of authorization include more than two ranks, rather than authorized or not authorized. In such examples, the one or more processors of the stream selection unit 44 may select the subset of the plurality of audio streams by comparing the rank of each of the plurality of audio streams to a rank of a user (e.g., user 1102) and selecting the subset of the plurality of audio streams based on the comparison. For example, the rank of the user may indicate that the user is not authorized to listen to audio streams of a different rank and the stream selection unit 44 may not select such audio streams. In other examples, the levels of authorization may be based on a plurality of contacts, which may be stored in memory of the content consumer device 14. In such examples, one or more processors of the stream selection unit 44 may select the subset of the plurality of audio streams by determining whether a source of one or more of the plurality of audio streams is associated with one or more of the plurality of contacts and selecting the subset of the plurality of audio streams based on the comparison. In some examples, the plurality of contacts include favorability rankings. In some examples, the one or more processors of the stream selection unit 44 may select the subset of the plurality of audio sources by determining whether a source of one or more of the plurality of audio streams is associated with one or more of the plurality of contacts of at least a predetermined favorability rating and selecting the subset of the plurality of audio streams based on the comparison. In some examples, the content consumer device 14 may refrain from decoding an audio stream associated with a privacy zone when the privacy zone does not have an associated level of authority.

In some examples, the content consumer device 14 may be configured to receive the plurality of audio streams and the associated level of authorization for each of the audio streams. In some examples, the content consumer device 14 may be configured to receive a level of authorization for the user of the device. In some examples, the content consumer device 14 may select the subset of the plurality of audio streams by selecting those audio streams that have an associated level of authorization that is not greater than the received authorization level for the user of the device and send the selected subset of the plurality of audio streams to an audible output device (e.g., headphones 48) for audible output of the selected subset of the plurality of audio streams.

In some examples, the subset of the plurality of audio streams include reproduced audio streams based on encoded information received in a bitstream (e.g., bitstream 27) that is decoded by the one or more processors of the content consumer device 14. In other examples, the audio streams may not be encoded.

Figure 4B:
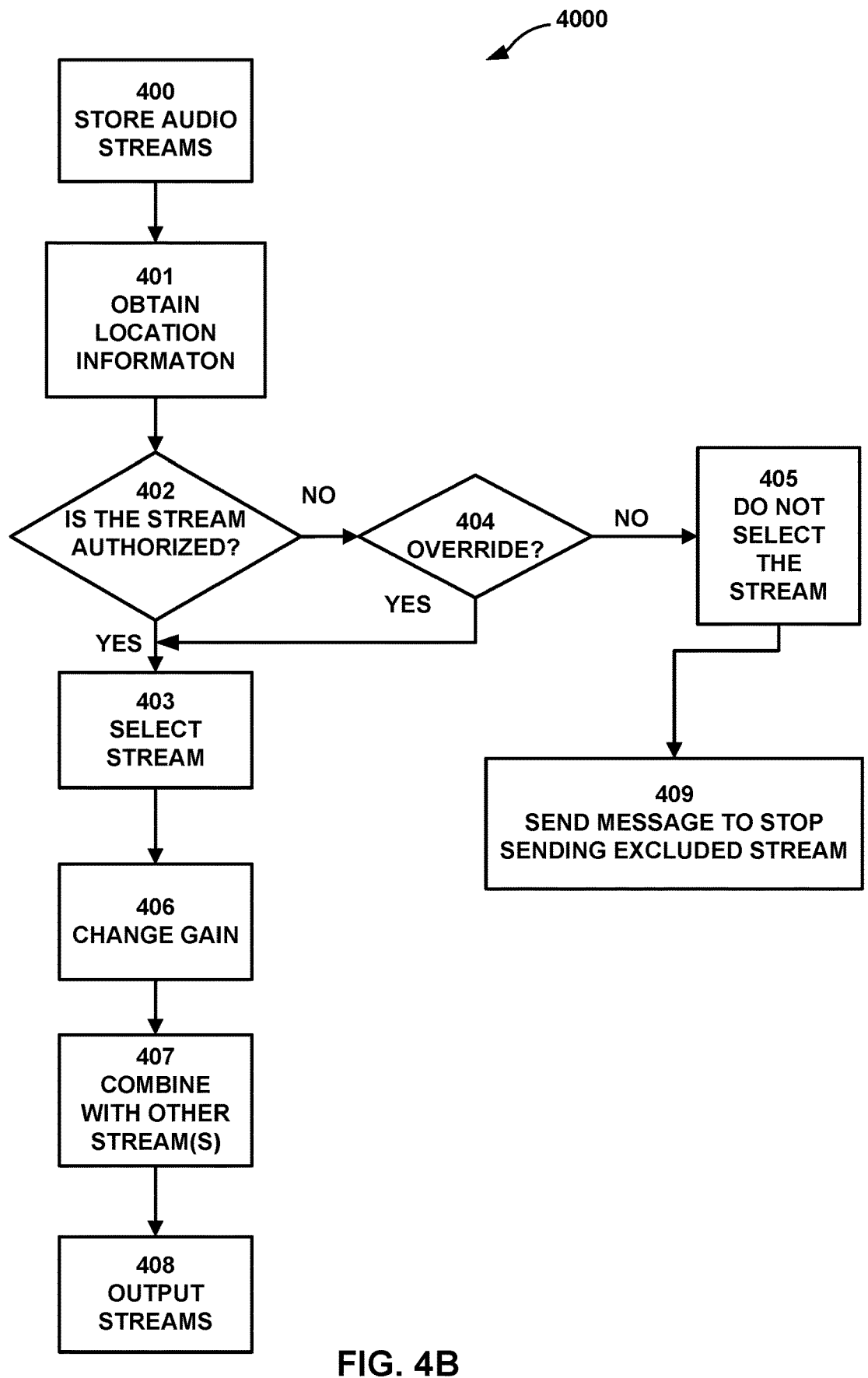

FIG. 4B is a flowchart illustrating another example of operations (4000) of the stream selection unit shown in the examples of FIGS. 1A-1C according to the techniques of this disclosure. One or more processors may store the audio streams and information associated with the audio streams, including location information and levels of authorization in memory of the content consumer device 14 (400). In some examples, the information associated with the audio streams may be metadata. The stream selection unit 44 may obtain location information (401). This location information may be associated with capture coordinates in the acoustical space, as discussed above. In some examples, the stream selection unit 44 may obtain the location information by reading the location information from memory, for example when the location information is associated with a particular audio stream, or, in other examples, the stream selection unit 44 may obtain the location information by calculating the location information, if necessary for example, when the location information is associated with a privacy zone.

Figure 4C:
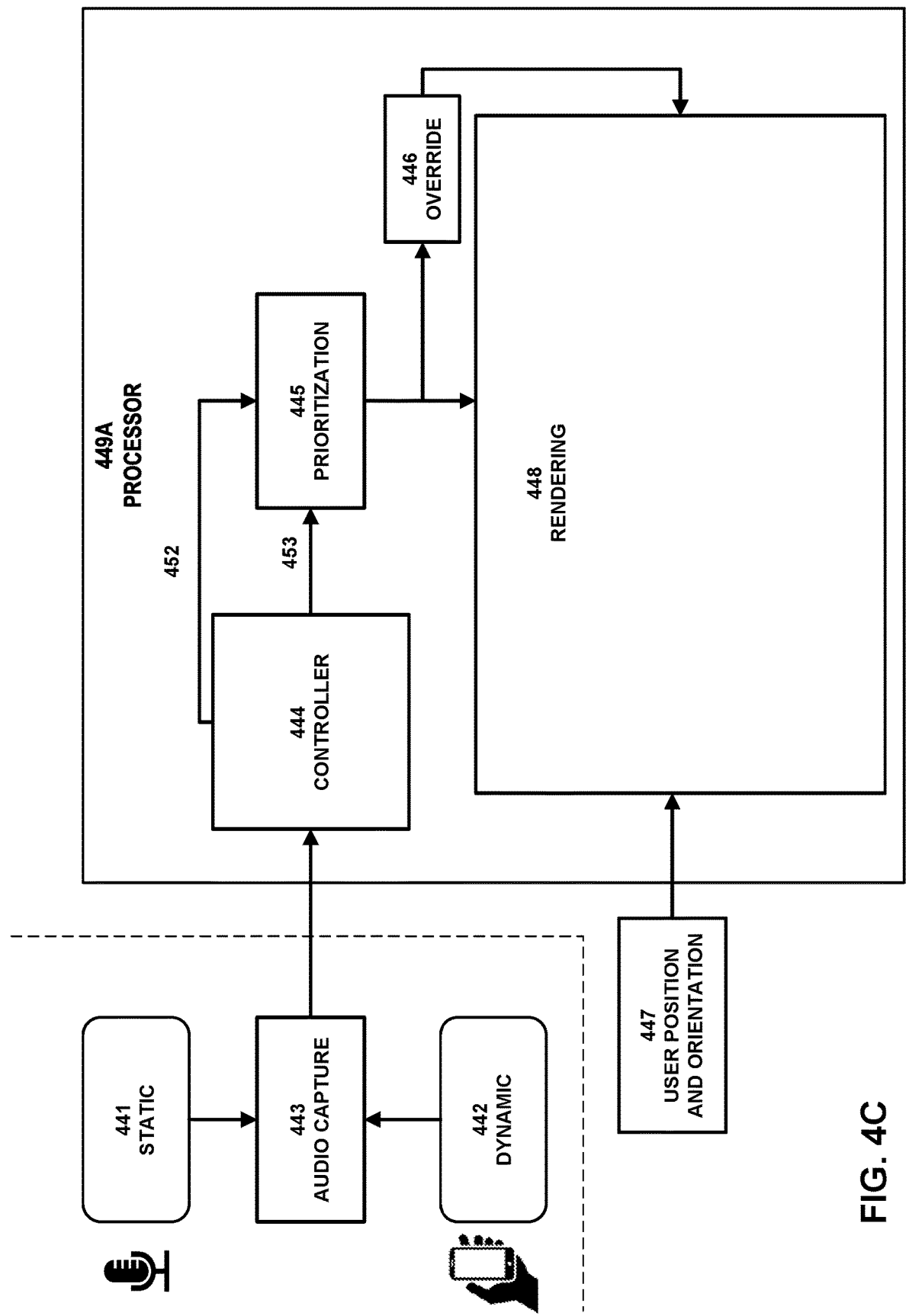
FIGS. 4C and 4D are diagrams illustrating various aspects of the techniques described in this disclosure with respect to privacy zones in accordance with various aspects of the techniques described in this disclosure.
Figure 4D:
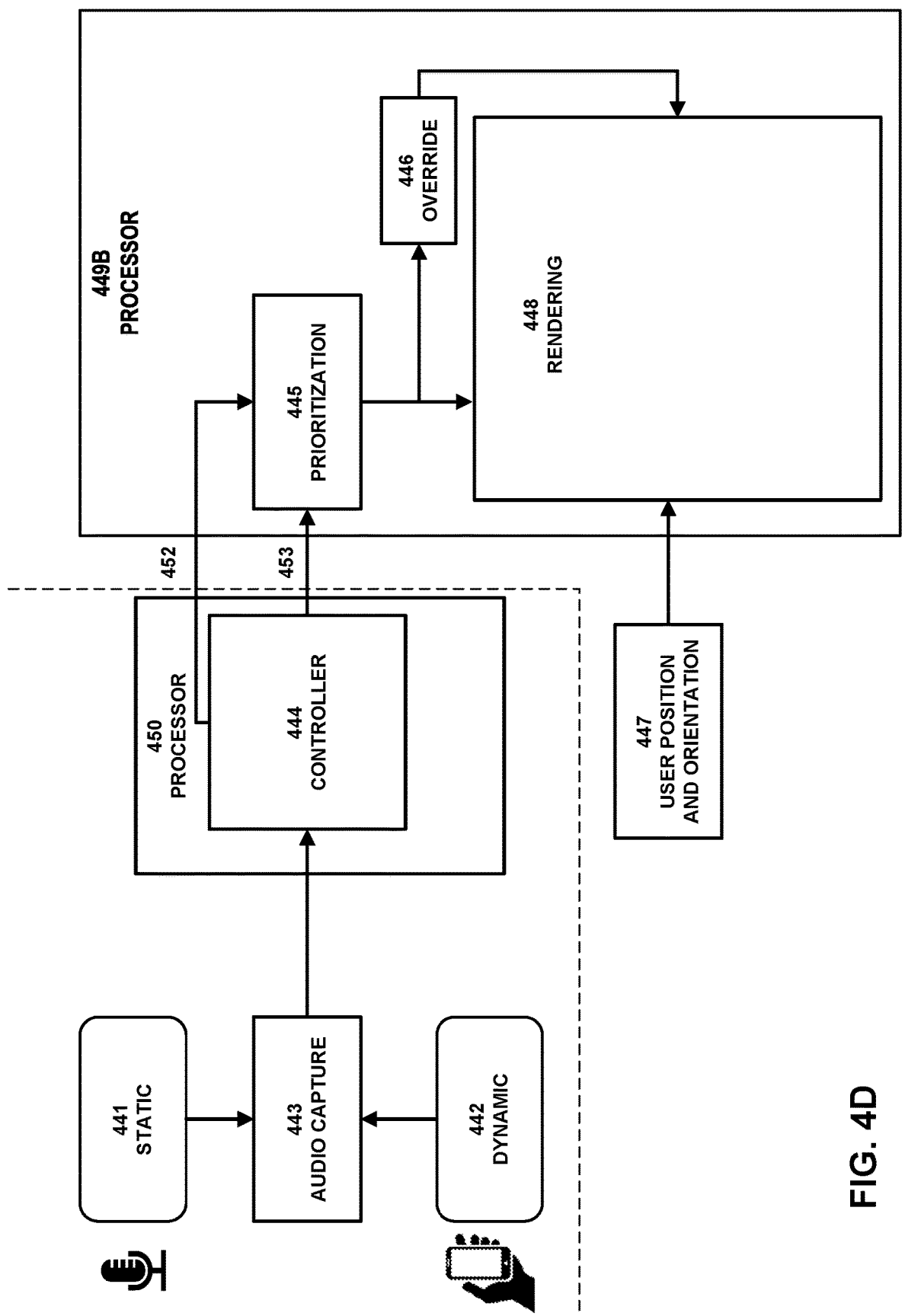

Levels of authorization may be associated with each audio stream or with privacy zones (to be discussed more thoroughly with respect to FIG. 4D). For instance, at a live event, there may be sensitive discussions occurring, or there may be inappropriate language being used or inappropriate topics being discussed for certain audiences. By assigning levels of authorization to each audio stream or privacy zone, the stream selection unit 44 may screen out the relevant audio streams or otherwise exclude them so as to not reproduce them. The stream selection unit 44 may determine whether a stream is authorized for user 1102 (402). For example, the stream selection unit 44 may determine whether an audio stream is authorized based on a level of authorization associated with the audio stream (e.g., either directly or by being associated with a privacy zone having an associated level of authorization). In some examples, the level of authorization may be a rank, as discussed below with respect to Table 1 and Table 2. In other examples, the level of authorization may be based on a contact list. In the example of the use of a contact list for authentication, the stream selection unit 44 may screen out or otherwise exclude the audio stream(s) or privacy zone when the content creator or source is not in the contact list or is not of a sufficiently high favorability ranking.

In one example, the audio playback system 16 (which may refer to either audio playback system 16A or audio playback system 16B, for simplicity purposes) may allow a user to override a level of authorization. Audio playback system 16 may obtain, from user 1102, a request to override at least one level of authorization and determine whether or not to override the level of authorization (404). When the level of authorization is overridden, then the stream selection unit 44 may select or add the audio stream (403) and the audio stream or privacy zone may be included in the audio output. When the level of authorization is not overridden, the respective audio stream or privacy zone may not be included in the output, for example, stream selection unit 44 would not select the audio stream (405). In some examples, some users may have the ability to override the level of authorization, while others do not. For example, a parent may have the ability of override the level of authorization, while a child may not. In some examples, a super user may have the ability to override the level of authorization, while a normal user may not. In one example, the audio playback system 16 may send a message to the source device 12 instructing the source device 12 or a base station to stop sending the excluded audio stream(s) (409). In this way, bandwidth within the transmission channel could be saved.

When the user does not have a sufficient level of authorization for a given audio stream or privacy zone, the stream selection unit 44 may exclude (e.g., not select) that audio stream or privacy zone. In one example, the audio playback system 16 may change the gain based upon the level of authorization of the audio stream or the privacy zone, boosting or attenuating the audio output (406). In some examples, the audio playback system 16 may null or zero out a given audio stream or privacy zone. The audio decoding device 34 may combine two or more selected audio streams together (407). The combining of selected audio streams could be done by way of mixing or interpolation, for example. The audio decoding device 34 may then output the selected streams (408).

FIGS. 4C and 4D are diagrams illustrating various aspects of the techniques described in this disclosure with respect to privacy zones. A static audio source 441, such as an open microphone is shown. The static audio source 441 may be a live audio source or a synthetic audio source. A dynamic audio source 442, such as in a user operated mobile handset where the user sets when the audio source is recording, is also shown. The dynamic audio source 442 may be a live audio source or a synthetic audio source. One or more of the static audio source 441 and/or the dynamic audio source 442 may capture or synthesize audio information 443. The source device may send the audio information to a controller 444. Controller 444 may process the audio information. In FIG. 4C, controller 444 is shown implemented in processor 449A which may be in the content consumer device 14. In FIG. 4D, controller 444 is shown implemented in processor 450 which may be in the source device 12A or 12B, rather than in processor 449B which may be in the content consumer device 14. For example, the controller 444 may compartmentalize the audio information into respective zones (e.g., privacy zones), create audio streams, and tag the audio streams with location information regarding the location of the audio sources 441 and 442, and the zonal compartmentalization, including the boundaries of the zones, through centroid and radius data, for example. In some examples, the location information may be metadata. The controller 444 may perform these functions online or offline. The controller 444 may then send the location information to prioritization unit 445 through the separate link 452 and the audio streams to the prioritization unit 445 through the link 453, or the location information and audio streams may be sent together through a single link.

In one example, the prioritization unit 445 may be where the levels of authorization are created and assigned. For example, the prioritization unit 445 may determine which privacy zones' gains may be changed and which privacy zones may be nulled or excluded from rendering.

An override unit 446 is shown. This override may permit the user to override the level of authorization for a given privacy zone.

The content consumer device 14 may determine user position and orientation information 447 and utilize the user position and orientation information 447, the audio streams, the location information, the zonal boundaries and the levels of authorization to create rendering 448.

Figure 4E:
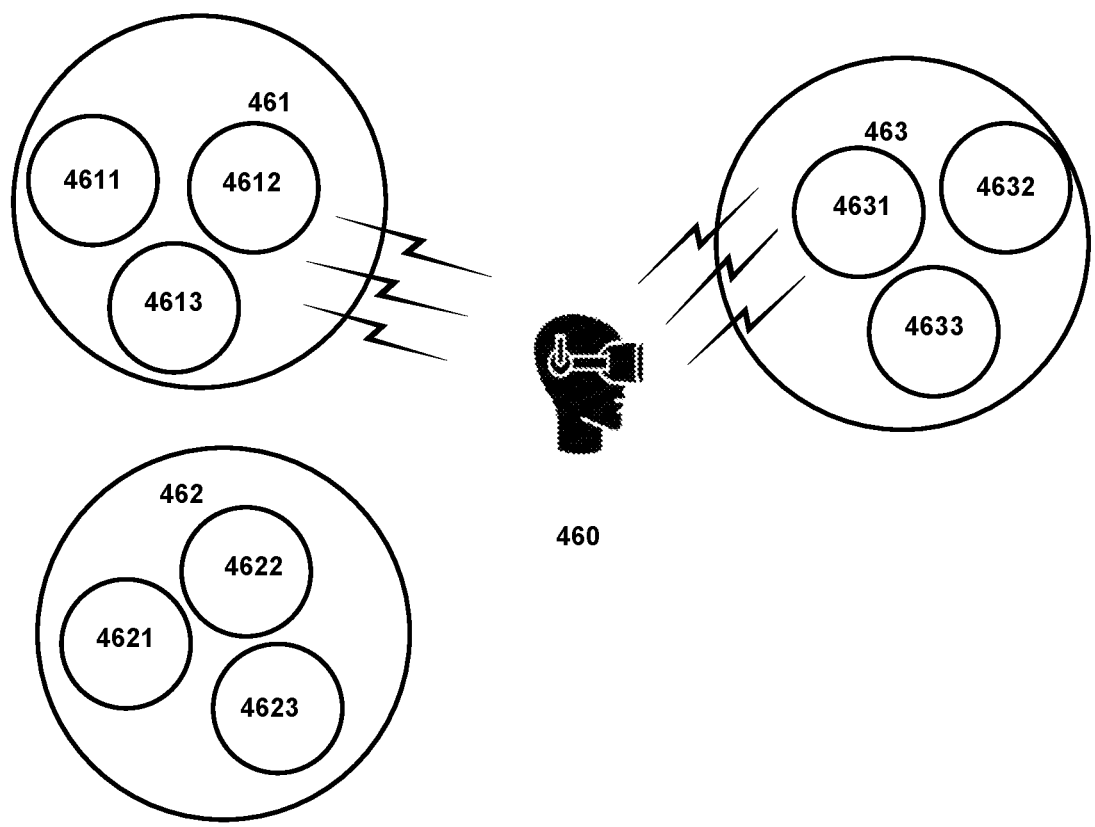
FIGS. 4E and 4F are diagrams further illustrating the use of privacy zones in accordance with various aspects of the techniques described in this disclosure.
Figure 4F:
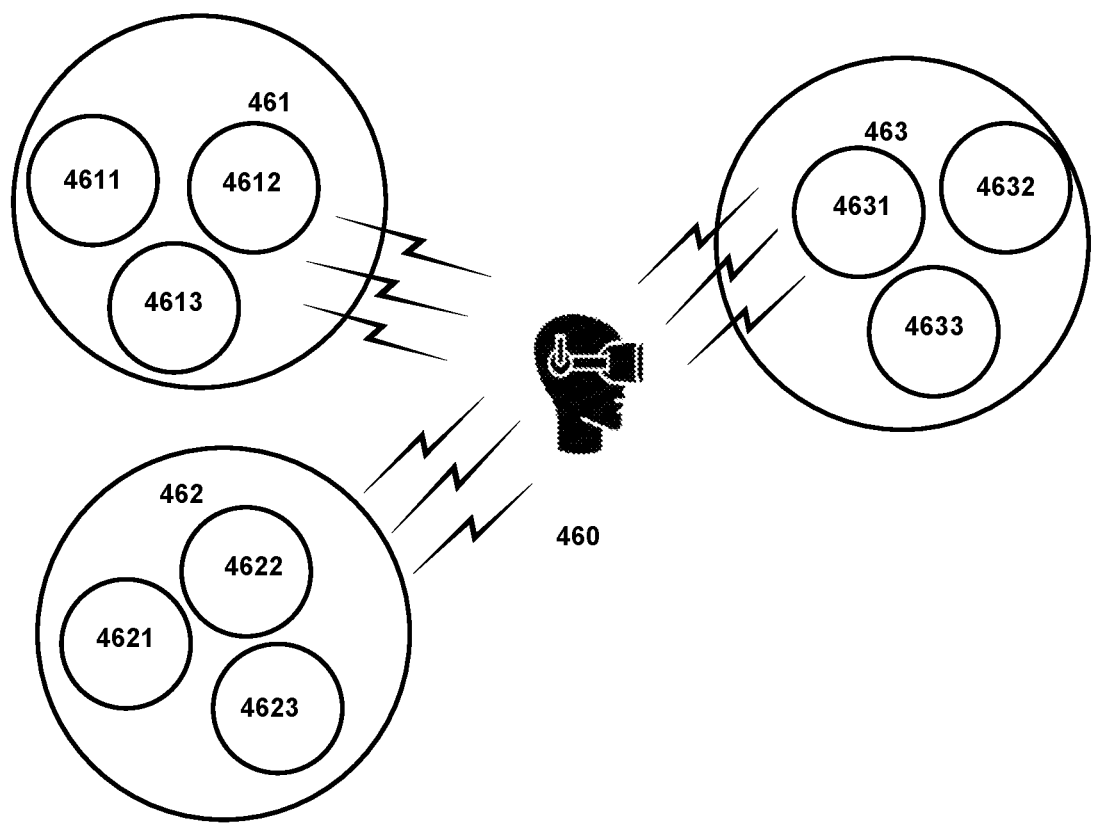

FIGS. 4E and 4F are diagrams further illustrating the concept of privacy zones in accordance with aspects of the present disclosure. The user 460 is shown near several groups of audio elements each representing an audio stream. In some examples, it may be useful to authorize which audio streams are used to create the audio experience of the user 460 in groups, rather than individually. In some examples, there may be multiple audio elements located in proximity to each other. For instance, in the example of the convention, multiple audio elements located in proximity to each other may be receiving sensitive information. So privacy zones may be created and each of the audio streams associated with a given privacy zone may be assigned a same level of authorization. In some examples, the level of authorization may be directly associated with each audio stream in the given privacy zone. In other examples, the level of authorization and the audio streams may be associated with the privacy zone. As used in this disclosure, when a level of authorization is said to be associated with an audio stream, the level of authorization may be directly associated with the audio stream or may be associated with a privacy zone which is associated with an audio stream. For example, when this disclosure states that a memory may store a plurality of audio streams and a level of authorization for each of the audio streams, the memory may store the plurality of audio streams and: 1) a level of authorization for a privacy zone(s) and an association between the plurality of audio streams and the privacy zone(s); 2) a level of authorization for each audio stream; or 3) any combination thereof.

The source device 12 may assign the user a level of authorization that may be a rank, for example. The prioritization unit 445 of FIGS. 4C and 4D may assign gain, attenuation, and nulling information (e.g., metadata) and, in this example, a rank for each privacy zone. For example, privacy zone 461 may contain audio streams 4611, 4612 and 4613. Privacy zone 462 may contain audio streams 4621, 4622 and 4623. Privacy zone 463 may contain audio streams 4631, 4632 and 4633. As shown in Table 1, the controller 444 may tag these audio streams as belonging to their respective privacy zones. The prioritization unit 445 may associate gain and nulling information (e.g., metadata) with the audio streams as well. As represented in Table 1, G is gain and N is nulling or excluding. In this example, the user 460 has a rank of 2 with respect to privacy zones 461 and 463, but a rank of 3 with respect to privacy zone 462. As indicated in the table, the stream selection unit 44 would exclude or null privacy zone 462 and the audio elements (or audio sources) within the privacy zone 462 (e.g., audio streams 4621-4623) would be unavailable for rendering as shown in FIG. 4E, unless the user 460 were to override the level of authorization, in which case the audio rendering would be as shown in FIG. 4F. While levels of authorization are shown as ranks in Table 1, the levels of authorization may be implemented in other manners, such as based on a contact list.

TABLE 1

| ZONE | TAG | METADATA | RANK |
|---|---|---|---|
| 461, 463 | 4611-4613, 4631-4633 | G - 20 dB, N = 0 | 2 |
| 462 | 4621-4623 | G - N/A, N = 1 | 3 |

Figure 4G:
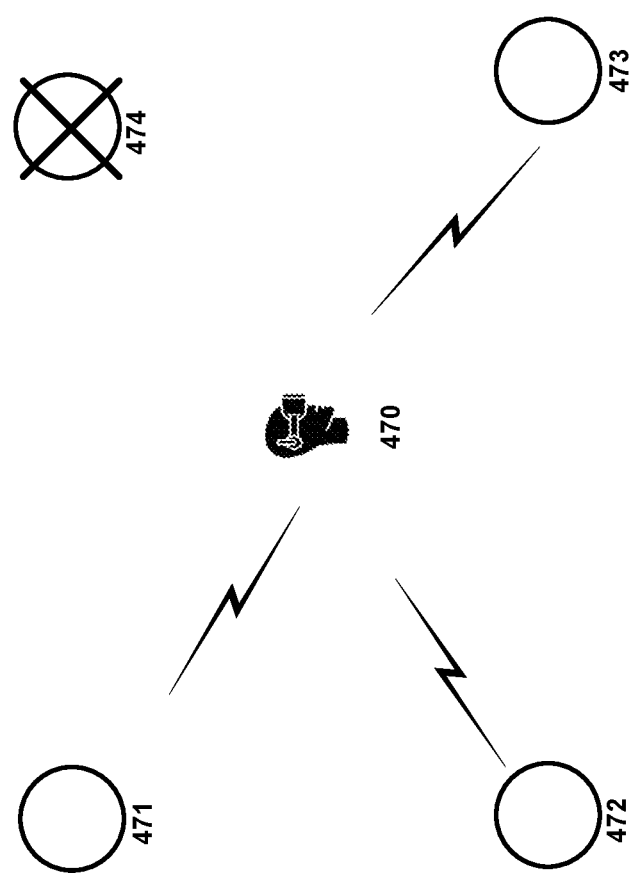
FIGS. 4G and 4H are diagrams illustrating the exclusion of separate audio streams in accordance with various aspects of the techniques described in this disclosure.
Figure 4H:
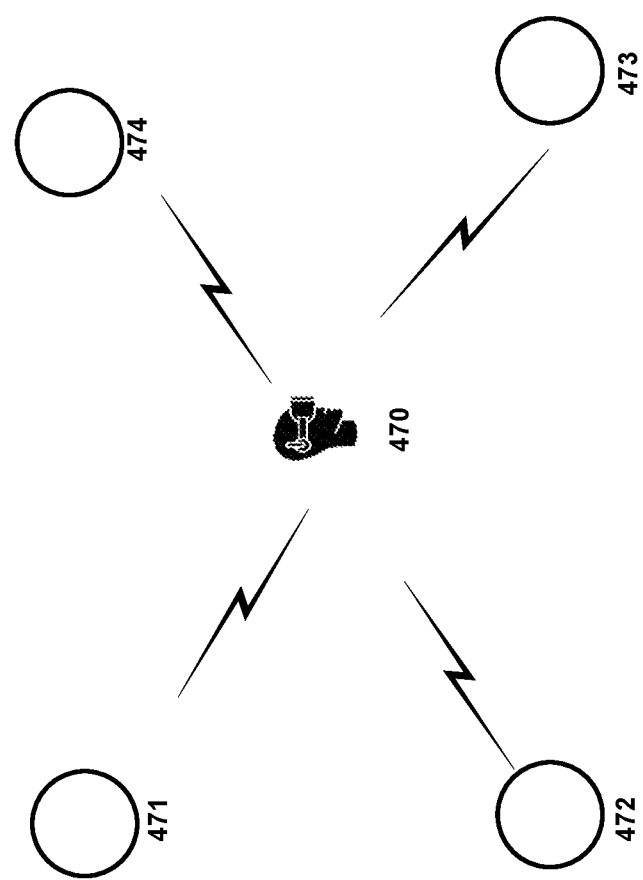

FIGS. 4G and 4H are diagrams illustrating the exclusion of separate audio streams, rather than privacy zones. In this example, the audio streams are not clustered, but are further away from each other and the controller 444 may tag them separately, each with their own level of authorization. For example, the audio streams 471, 472, 473 and 474 may not contain overlapping information. In some examples, each of the audio streams 471, 472, 473 and 474 may have a different level of authorization. Referencing Table 2, in this example, the controller 444 may tag each of the audio streams 471, 472, 473 and 474 with a separate level of authorization and assign none of them to a privacy zone. The prioritization unit 445 may assign gain and nulling information (e.g., metadata) to each audio stream. In one example, the content consumer device 14 may assign a rank for the user for each audio stream. As can be seen in Table 2, the stream selection unit 44 may null or exclude the audio stream 474 from the user's 470 rendering, as shown in FIG. 4G, unless user 470 overrides the prioritization, then the user's 470 rendering would appear as shown in FIG. 4H. In other examples, rather than a rank as a level of authorization, a contact list may be used as described above.

TABLE 2

| ZONE | TAG | METADATA | RANK |
|---|---|---|---|
| N/A | 471 | G = 0 dB, N = 0 | 2 |
| N/A | 472 | G = 0 dB, N = 0 | 2 |
| N/A | 473 | G = 0 dB, N = 0 | 2 |
| N/A | 474 | G = N/A, N = 1 | 1 |

Figure 5:
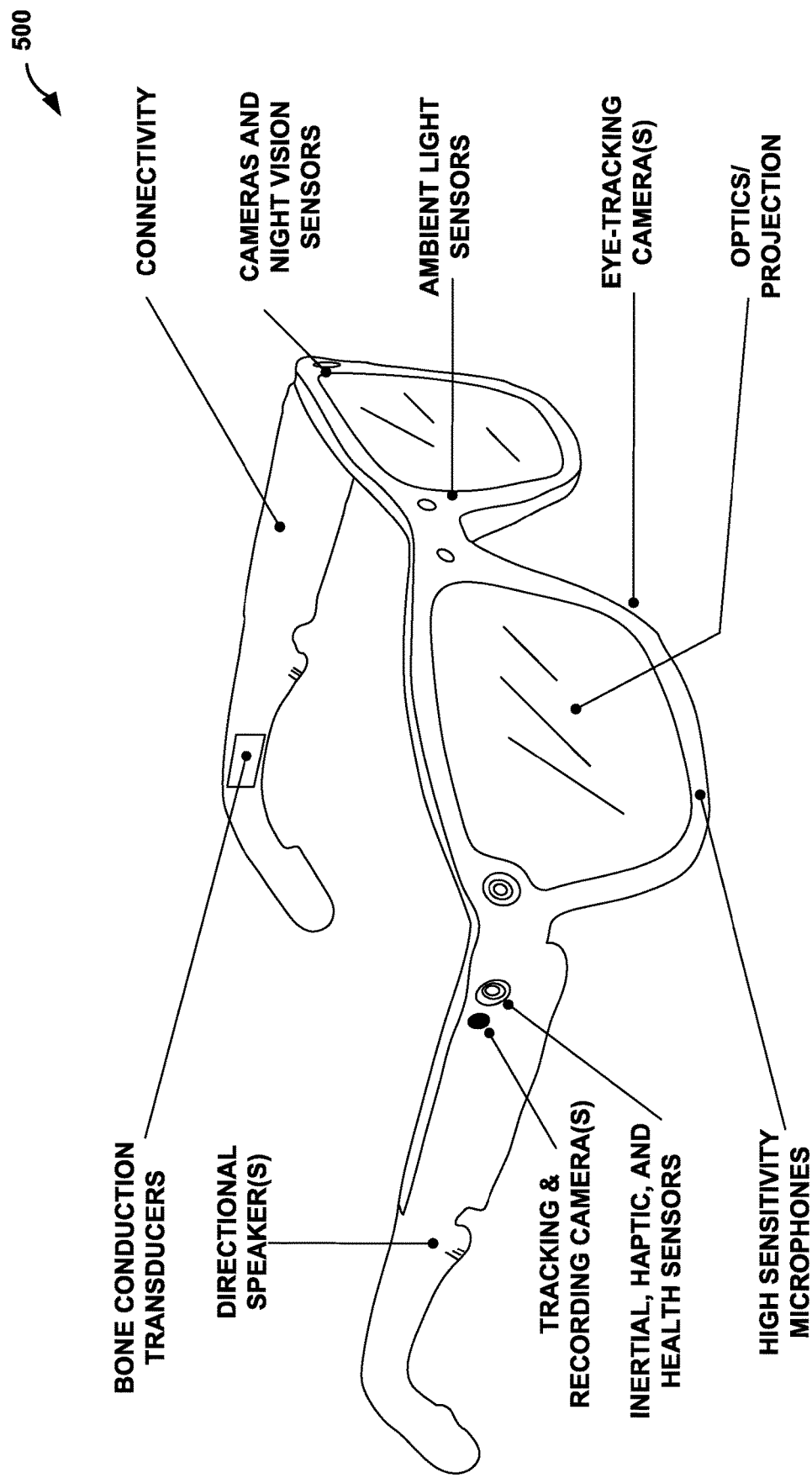
FIG. 5 is a diagram illustrating an example of a wearable device that may operate in accordance with various aspect of the techniques described in this disclosure.

FIG. 5 is a diagram illustrating an example of a wearable device 500 that may operate in accordance with various aspect of the techniques described in this disclosure. In various examples, the wearable device 500 may represent a VR headset (such as the VR device 1100 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 1100, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, etc. The wearable device 500 also includes one or more ambient light sensors, one or more cameras and night vision sensors, and one or more bone conduction transducers. In some instances, the wearable device 500 may also include one or more passive and/or active cameras with fisheye lenses and/or telephoto lenses. Although not shown in FIG. 5, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 5, wearable device 500 may include other types of sensors for detecting translational distance.

Although described with respect to particular examples of wearable devices, such as the VR device 1100 discussed above with respect to the examples of FIG. 2 and other devices set forth in the examples of FIGS. 1A-1C, a person of ordinary skill in the art would appreciate that descriptions related to FIGS. 1A-1C and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 6A:
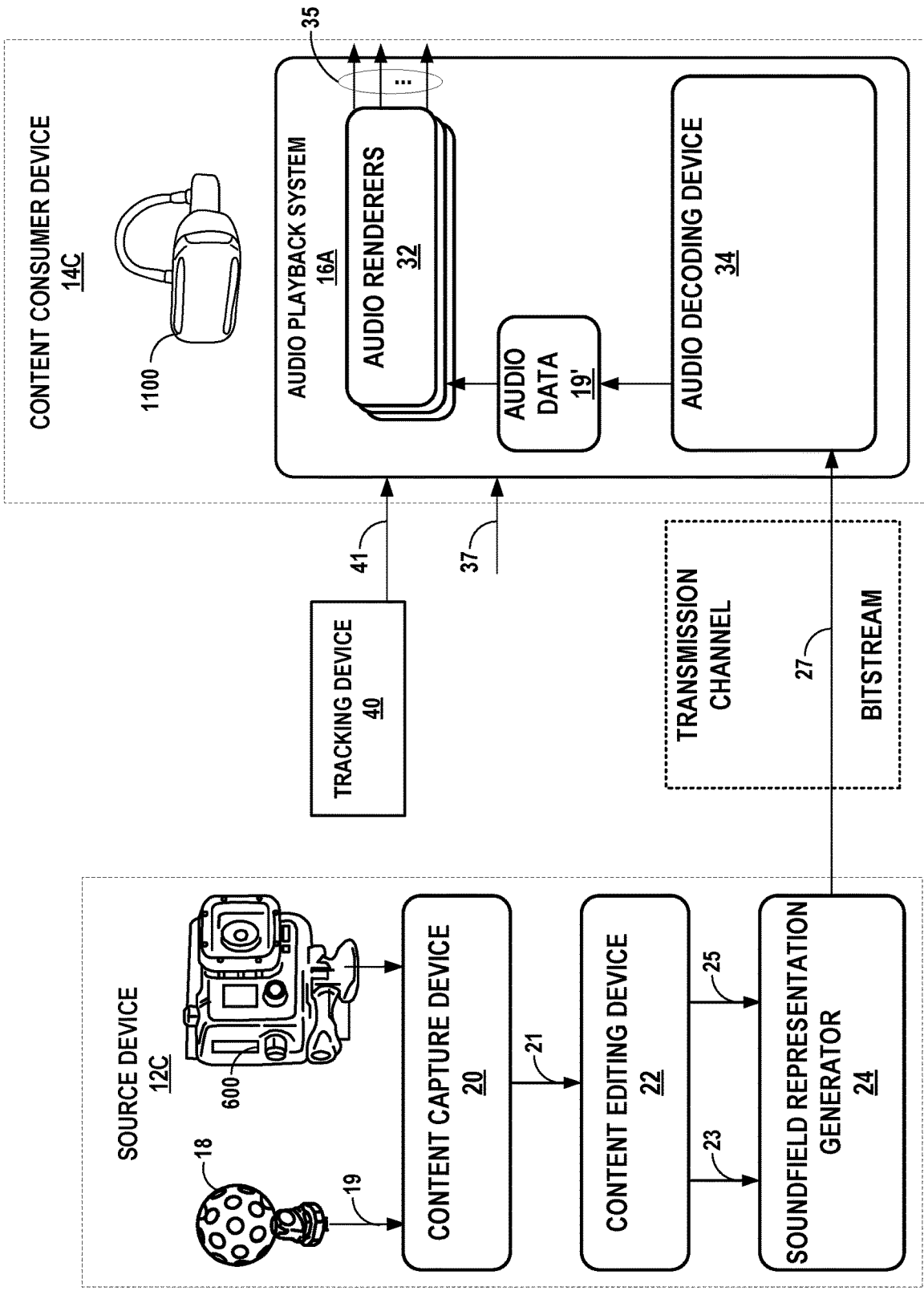
FIGS. 6A and 6B are diagrams illustrating other example systems that may perform various aspects of the techniques described in this disclosure.
Figure 6B:
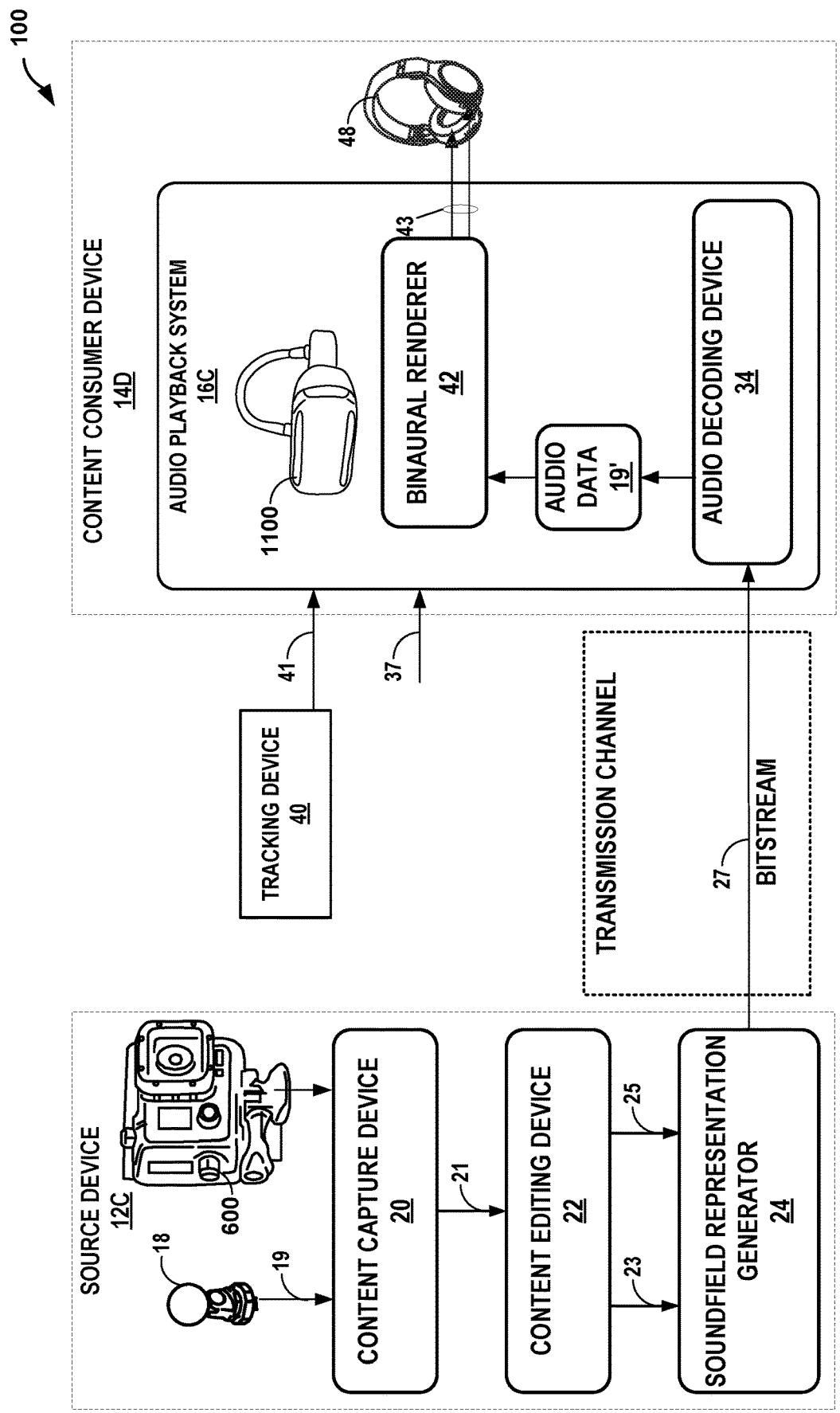

FIGS. 6A and 6B are diagrams illustrating example systems that may perform various aspects of the techniques described in this disclosure. FIG. 6A illustrates an example in which the source device 12C further includes a camera 600. The camera 600 may be configured to capture video data, and provide the captured raw video data to the content capture device 20. The content capture device 20 may provide the video data to another component of the source device 12C, for further processing into viewport-divided portions.

In the example of FIG. 6A, the content consumer device 14C also includes the VR device 1100. It will be understood that, in various implementations, the VR device 1100 may be included in, or externally coupled to, the content consumer device 14C. The VR device 1100 includes display hardware and speaker hardware for outputting video data (e.g., as associated with various viewports) and for rendering audio data.

FIG. 6B illustrates an example in which the audio renderers 32 shown in FIG. 6A are replaced with a binaural renderer 42 capable of performing binaural rendering using one or more HRTFs or the other functions capable of rendering to left and right speaker feeds 43. The audio playback system 16C of content consumer device 14D may output the left and right speaker feeds 43 to headphones 48.

The headphones 48 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43. It should be noted that the content consumer device 14C and the content consumer device 14D may be used with the source device 12B of FIG. 1C.

Figure 7:
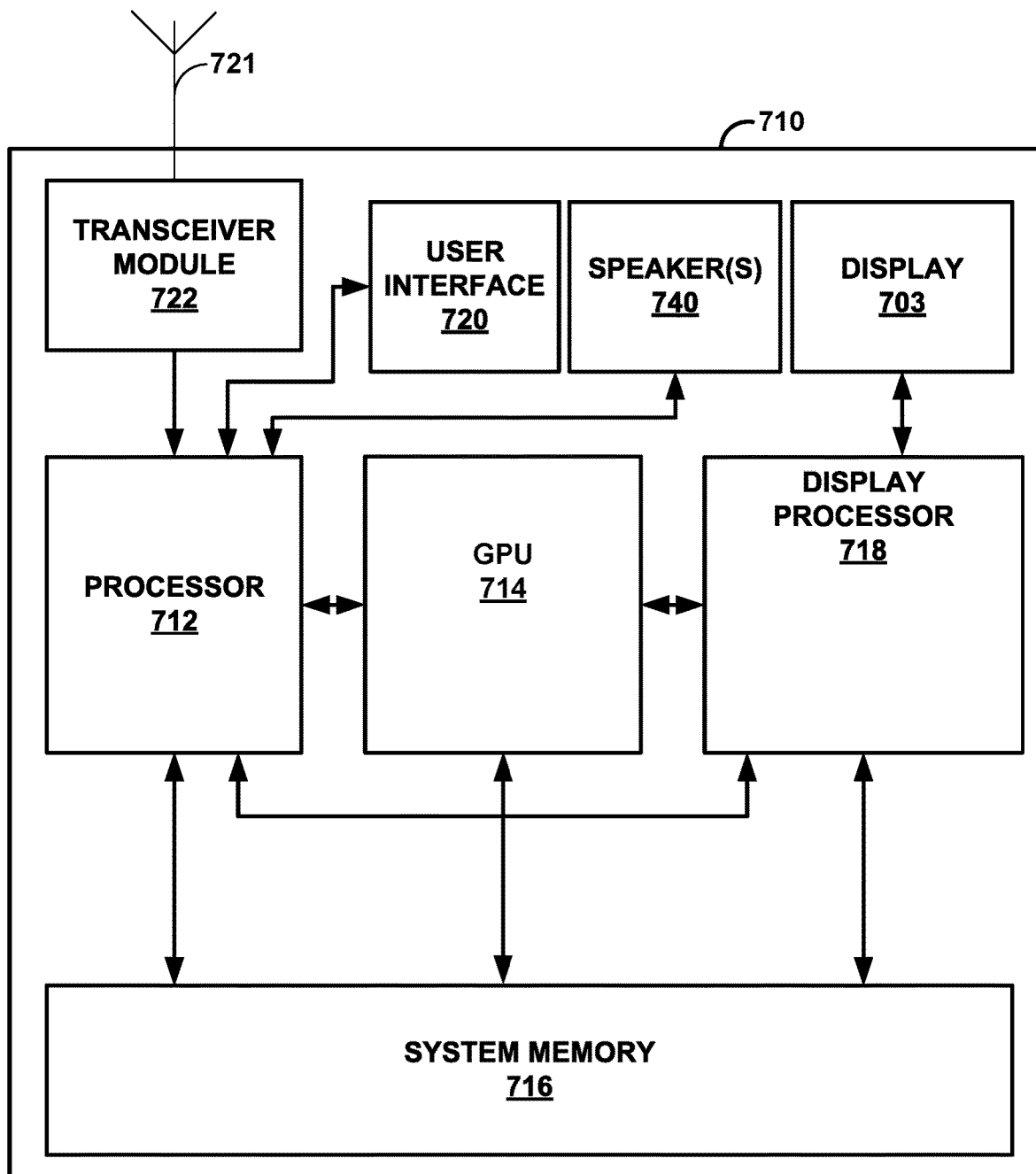
FIG. 7 is a block diagram illustrating example components of one or more of the source device and the content consumer device shown in the examples of FIGS. 1A-1C.

FIG. 7 is a block diagram illustrating example components of one or more of the source device and the content consumer device shown in the examples of FIGS. 1A-1C. In the example of FIG. 7, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (e.g., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (e.g., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may include one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 8A:
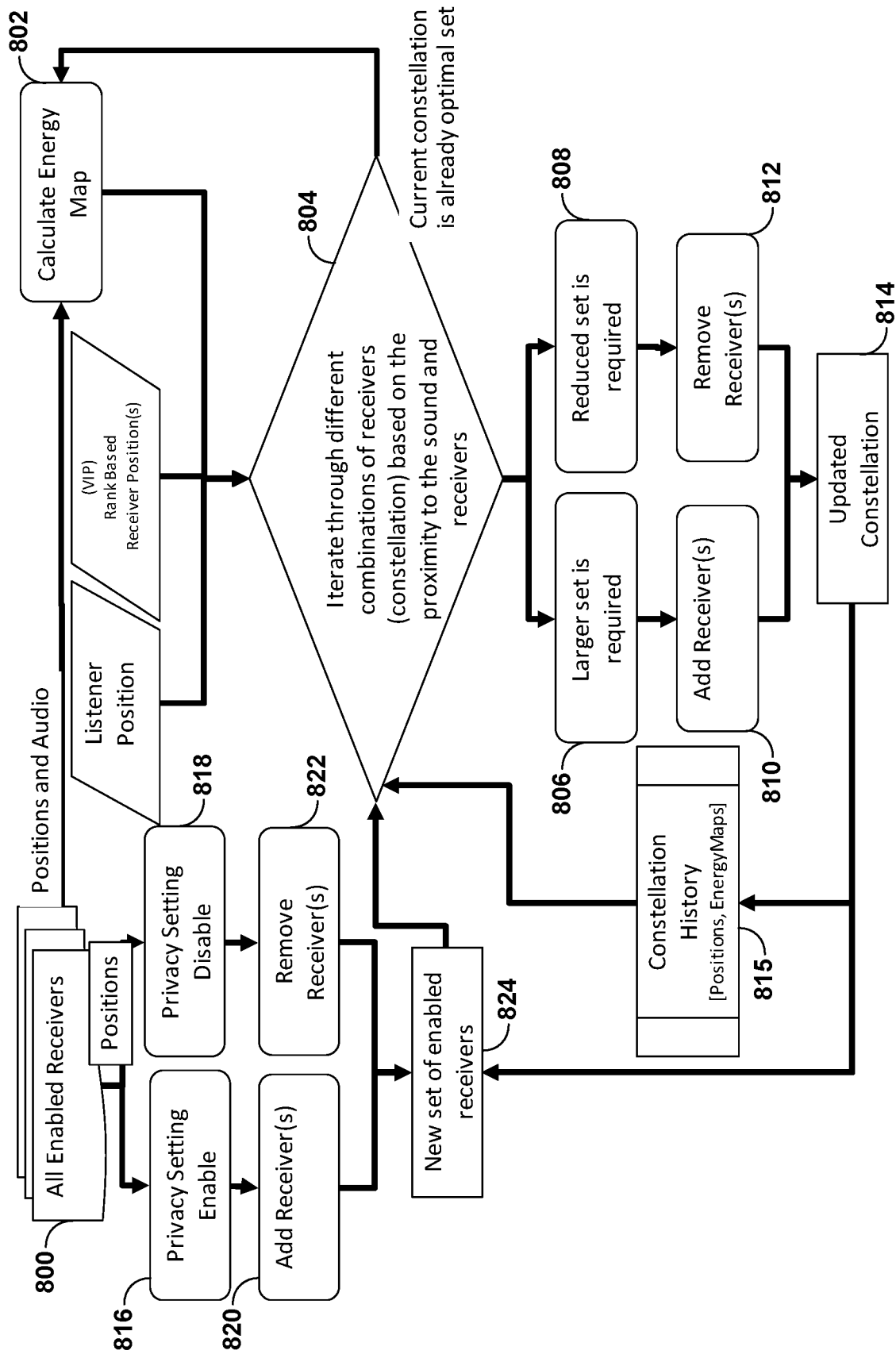
FIGS. 8A-8C are flowcharts illustrating example operations of the stream selection unit shown in the examples of FIGS. 1A-1C in performing various aspects of the stream selection techniques.
Figure 8B:
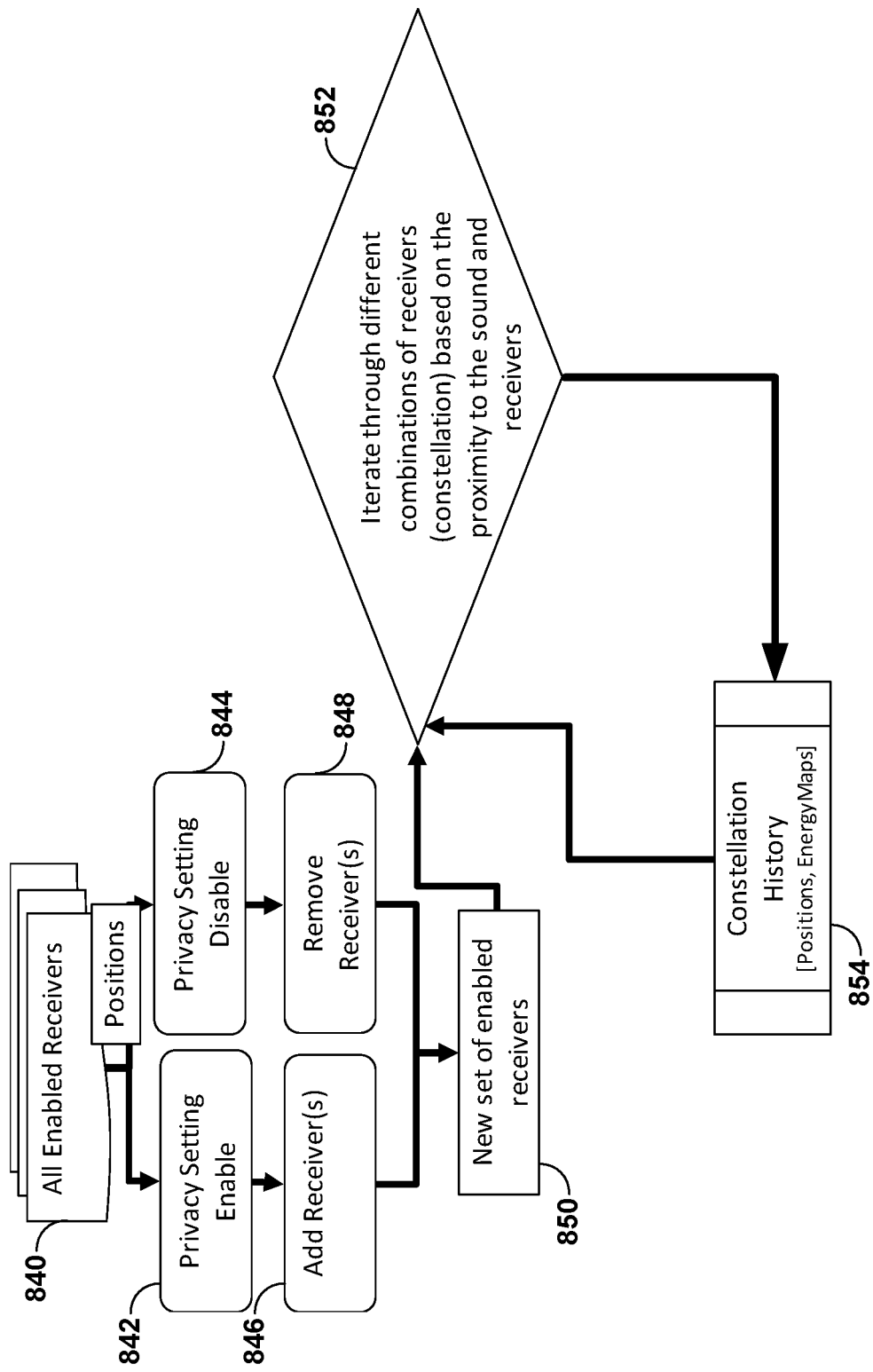
Figure 8C:
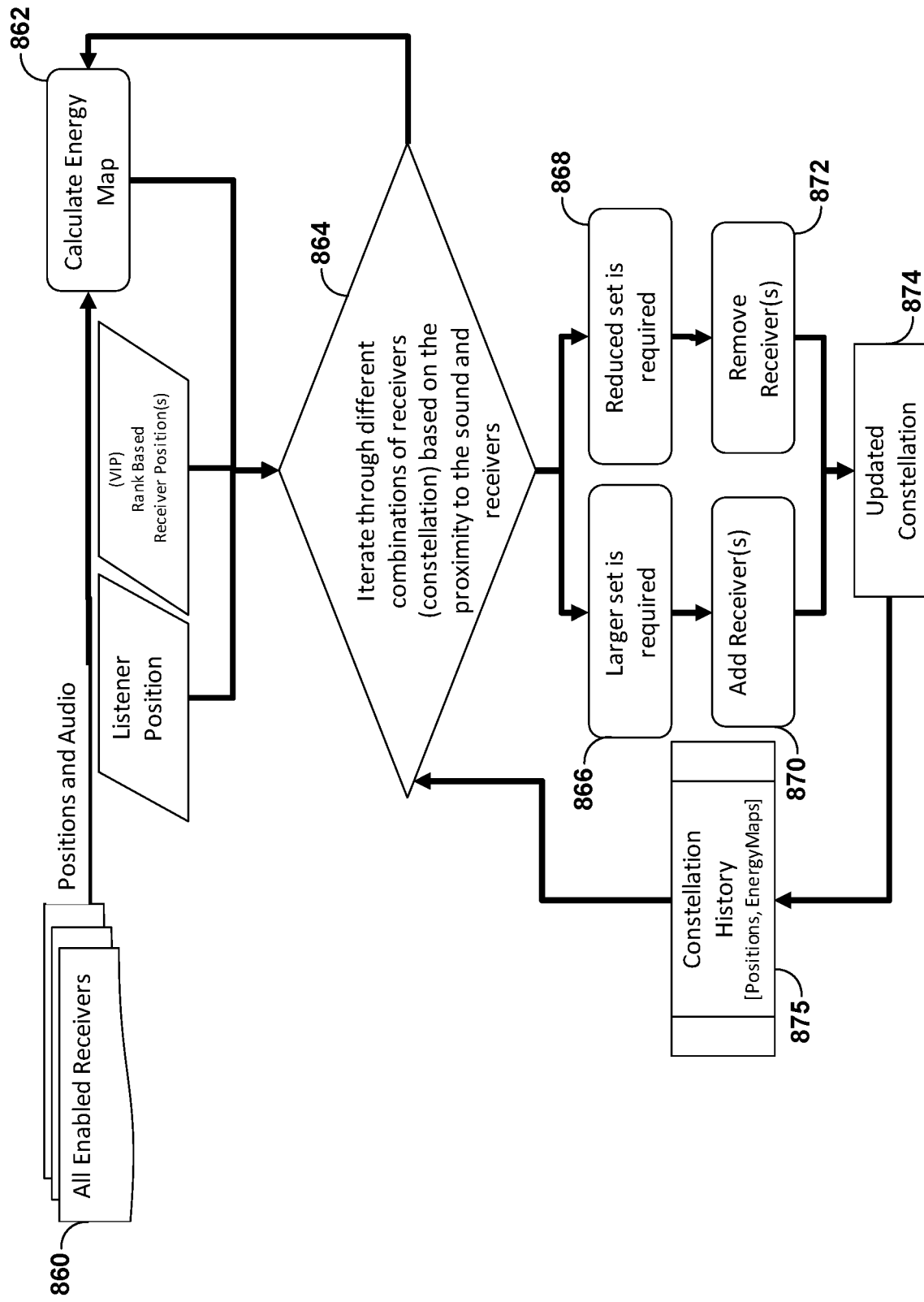

FIG. 8A-8C are flowcharts illustrating example operation of the stream selection unit 44 shown in the examples of FIGS. 1A-C in performing various aspects of the stream selection techniques. Referring first to the example of FIG. 8A, the stream selection unit 44 may obtain audio stream 27 from all enabled audio elements (also referred to as receivers), where the audio streams 27 may include corresponding information (e.g., metadata), such as the ALI 45A (800). The stream selection unit 44 may perform the energy analysis with respect to each of the audio streams 27 to calculate a respective energy map (802).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above)(804), and the process may return to 802. As shown in FIG. 8A, the audio elements may be ranked or otherwise associated with different access rights. The stream selection unit 44 may iterate, based on the listener position (which is another way to refer to the "virtual location" or "device location") represented by the DLI 45B, and the audio element positions represented by the ALI 45A, in the manner described above to identify whether a larger subset of the audio streams 27 or a reduced subset of the audio streams 27 is required (806, 808).

When a larger subset of the audio streams 27 is required, the stream selection unit 44 may add audio element(s), or in other words, additional audio streams to the audio data 19'

(such as when the user is closer to the audio source in the example of FIG. 3A) (810). When a reduced subset of the audio streams 27 is required, the stream selection unit 44 may remove audio element(s) or in other words existing audio stream(s) from the audio data 19' (such as when the user is farther from the audio source in the example of FIG. 3A) (812).

In some examples, the stream selection unit 44 may determine that the current constellation of audio elements is an optimal set (or, in other words, that the existing audio data 19' is to remain the same as the selection process described herein results in the same audio data 19') (804) and the process may return to 802. However, when audio streams are added or removed from the audio data 19', the stream selection unit 44 may update the CM 47 (814), generating a constellation history (815) (including positions, energy maps, etc.).

In addition, the stream selection unit 44 may determine whether privacy settings enable or disable addition of the audio elements (where the privacy settings may refer to digital access rights that limit access to one or more of the audio streams 27, e.g., by way of a password, a level of authorization or rank, a time, etc.) (816, 818). When privacy settings enable addition of aa audio element, the stream selection unit 44 may add audio element(s) to the updated CM 47 (which refers to addition of audio stream(s) to the audio data 19') (820). When privacy settings disable addition of an audio element, the stream selection unit 44 may remove audio element(s)s from the updated CM 47 (which refers to removal of audio stream(s) from the audio data 19') (822). In this manner, the stream selection unit 44 may identify a new set of enabled audio elements (824).

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element). The stream selection unit 44 may further update the energy maps at an audio frame rate (meaning that the energy maps are updated each frame).

Referring next to the example of FIG. 8B, the stream selection unit 44 may operate in the manner described above with respect to FIG. 8A, except that the stream selection unit 44 may not base the determination of the CM 47 on energy maps. As such, the stream selection unit 44 may obtain audio stream 27 from all enabled audio elements, where the audio streams 27 may include corresponding information (e.g., metadata), such as the ALI 45A (840). The stream selection unit 44 may determine whether privacy settings enable or disable addition of the audio elements (where the privacy settings may refer to digital access rights that limit access to one or more of the audio streams 27, e.g., by way of a password, an level of authorization or rank, a time, etc.) (842, 844).

When privacy settings enable addition of an audio element, the stream selection unit 44 may add audio element(s) to the updated CM 47 (which refers to addition of audio stream(s) to the audio data 19')(846). When privacy settings disable addition of an audio element, the stream selection unit 44 may remove audio element(s) from the updated CM 47 (which refers to removal of audio stream(s) from the audio data 19') (848). In this manner, the stream selection unit 44 may identify a new set of enabled audio elements (850). The stream selection unit 44 may iterate (852) through the different combinations of audio elements in the CM 47 to determine the constellation map history (854), which is representative of the audio data 19'.

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element).

Referring next to the example of FIG. 8C, the stream selection unit 44 may operate in the manner described above with respect to FIG. 8A, except that the stream selection unit 44 may not base the determination of the CM 47 on privacy settings enabled audio elements. As such, the stream selection unit 44 may obtain audio stream 27 from all enabled audio elements, where the audio streams 27 may include corresponding information (e.g., metadata), such as the ALI 45A (860). The stream selection unit 44 may perform the energy analysis with respect to each of the audio streams 27 to calculate a respective energy map (862).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above)(864), and the process may return to 862. As shown in FIG. 8C, the audio elements may be ranked or otherwise associated with different access rights. The stream selection unit 44 may iterate, based on the listener position (which again is another way to refer to the "virtual location" or "device location" discussed above) represented by the DLI 45B, and the audio element positions represented by the ALI 45A, in the manner described above to identify whether a larger subset of the audio streams 27 or a reduced subset of the audio streams 27 is required (866, 868).

When a larger subset of the audio streams 27 is required, the stream selection unit 44 may add audio element(s), or in other words, additional audio stream(s) to the audio data 19' (such as when the user is closer to the audio source in the example of FIG. 3A) (870). When a reduced subset of the audio streams 27 is required, the stream selection unit 44 may remove audio element(s) or in other words existing audio stream(s) from the audio data 19' (such as when the user is farther from the audio source in the example of FIG. 3A) (872).

In some examples, the stream selection unit 44 may determine that the current constellation of audio elements is an optimal set (or, in other words, that the existing audio data 19' is to remain the same as the selection process described herein results in the same audio data 19') (864), and the process may return to 862. However, when audio streams are added or removed from the audio data 19', the stream selection unit 44 may update the CM 47 (874), generating a constellation history (875).

The stream selection unit 44 may iterate in this fashion and update various inputs according to any given frequency. For example, the stream selection unit 44 may update positions at sensor rate (meaning that as positions are changed through movement of the audio element). The stream selection unit 44 may further update the energy maps at an audio frame rate (meaning that the energy maps are updated each frame).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video packets, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

Figure 9:
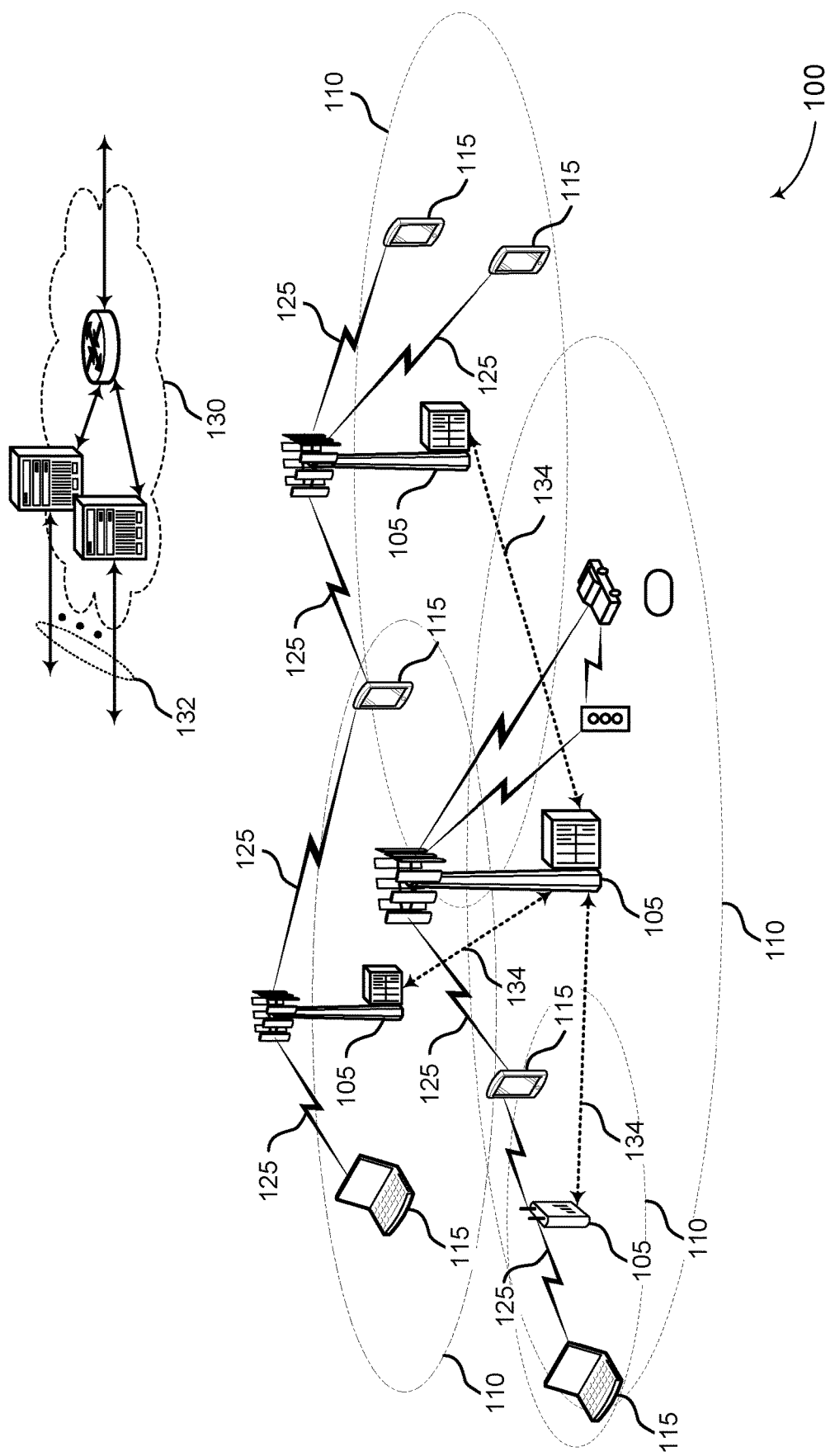
FIG. 9 illustrates an example of a wireless communications system that supports privacy zones and levels of authorization in accordance with aspects of the present disclosure.

FIG. 9 illustrates an example of a wireless communications system 100 that supports privacy restrictions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a fifth generation (5G) cellular network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro, 5G cellular or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that was stored in memory or was previously created or synthesized. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use information (e.g., metadata) indicating privacy zones and/or levels of authorization affect the gain and/or nulling of various audio streams and/or audio sources as described with respect to FIGS. 4A-4H.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz Industrial, Scientific, Medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The present disclosure includes the following examples.

Example 1. A device configured to play one or more of a plurality of audio streams, the device comprising: a memory configured to store the plurality of audio streams and corresponding audio metadata including a level of authorization for each of the audio streams and, location information associated with coordinates of an acoustical space in which the corresponding one of the plurality of audio streams was captured; and one or more processors coupled to the memory, and configured to: select, based on the level of authorization in the audio metadata and the location information, a subset of the plurality of audio streams, the subset of the plurality of audio streams excluding at least one of the plurality of audio streams.

Example 2. The device of example 1, wherein the one or more processors are further configured to obtain the location information.

Example 3. The device of example 2, wherein the one or more processors obtain the location information by reading the location information from the memory.

Example 4. The device of example 2, wherein excluded streams are associated with one or more privacy zones and the one or more processors obtain the location information by determining the location information.

Example 5. The device of any combination of examples 1-4, wherein the one or more processors are further configured to output the subset of the plurality of audio streams to one or more speakers.

Example 6. The device of any combination of examples 1-5, wherein the one or more processors are further configured to change a gain of one or more audio streams in the subset of the plurality of audio streams based on the level of authorization in the audio metadata.

Example 7. The device of any combination of examples 1-6, wherein the one or more microprocessors are further configured to determine a privacy zone based on the level of authorization in the audio metadata and the location information associated with the coordinates of the acoustical space.

Example 8. The device of example 7, wherein the one or more microprocessors are further configured to determine the privacy zone by obtaining the privacy zone.

Example 9. The device of any combination of examples 1-6, wherein the one or more microprocessors are further configured to generate a privacy zone based on the level of authorization in the audio metadata and the location information associated with the coordinates of the acoustical space.

Example 10. The device of any combination of examples 1-9, wherein the one or more microprocessors are further configured to send a signal to at least one of a source device or base station indicating to stop sending excluded audio streams.

Example 11. The device of any combination of examples 1-10, wherein the one or more processors are further configured to combine at least two of the subset of the plurality of audio streams.

Example 12. The device of example 11, wherein the one or more processors combine the at least two of the subset of the plurality of audio streams by at least one of mixing or interpolation.

Example 13. The device of any combination of examples 1-12, wherein the one or more processors are further configured to override the level of authorization in the audio metadata.

Example 14. The device of example 13, wherein the one or more processors are configured to: output the plurality of audio streams to one or more speakers based upon the level of authorization in the audio metadata being overridden.

Example 15. The device of any combination of examples 1-14, wherein the level of authorization in the audio metadata is received from a source device.

Example 16. The device of any combination of examples 1-15, wherein the one or more processors are further configured to generate the level of authorization in the audio metadata.

Example 17. The device of any combination of examples 1-16, further comprising a display device.

Example 18. The device of example 17, further comprising a microphone, wherein the one or more processors are further configured to receive a voice command from the microphone and control the display device based on the voice command.

Example 19. The device of any combination of examples 1-18, further comprising one or more speakers.

Example 20. The device of any combination of examples 1-19, wherein the device comprises an extended reality headset, and wherein the acoustical space comprises a scene represented by video data captured by a camera.

Example 21. The device of any combination of examples 1-19, wherein the device comprises an extended reality headset, and wherein the acoustical space comprises a virtual world.

Example 22. The device of any combination of examples 1-21, further comprising a head-mounted device configured to present the acoustical space.

Example 23. The device of any combination of examples 1-19, wherein the device comprises a mobile handset.

Example 24. The device of any combination of examples 1-23, further comprising a wireless transceiver, the wireless transceiver being coupled to the one or more processors and being configured to receive a wireless signal.

Example 25. The device of example 24, wherein the wireless signal is Bluetooth.

Example 26. The device of example 24, wherein the wireless signal conforms to fifth generation (5G) cellular protocol.

Example 27. A method of playing one or more of a plurality of audio streams comprising: storing, by a memory, the plurality of audio streams and corresponding audio metadata including a level of authorization for each of the audio streams and, location information associated with coordinates of an acoustical space in which the corresponding one of the plurality of audio streams was captured; and selecting, by the one or more processors and based on the level of authorization of the audio metadata and the location information, a subset of the plurality of audio streams, the subset of the plurality of audio streams excluding at least one of the plurality of audio streams.

Example 28. The method of example 27, further comprising obtaining, by the one or more processors, the location information.

Example 29. The method of example 28, wherein the obtaining the location information is by reading the location information from the memory.

Example 30. The method of example 28, wherein the obtaining the location information is by determining the location information and wherein excluded streams are associated with one or more privacy zones.

Example 31. The method of any combination of examples 27-30, further comprising outputting, by the one or more processors, the subset of the plurality of audio streams to one or more speakers.

Example 32. The method of any combination of examples 27-31, further comprising changing, by the one or more processors, a gain of one or more of audio streams within the subset of the plurality of audio streams based on the level of authorization in the audio metadata.

Example 33. The method of any combination of examples 27-32, further comprising determining, by the one or more processors, a privacy zone based on the level of authorization in the audio metadata and the location information associated with the coordinates of the acoustical space.

Example 34. The method of example 33, wherein the determining the privacy zone is by obtaining the privacy zone.

Example 35. The method of any combination of examples 27-34, further comprising generating, by the one or more processors, a privacy zone based on the level of authorization in the audio metadata and the location information associated with the coordinates of the acoustical space.

Example 36. The method of any combination of examples 27-35, further comprising sending, by the one or more processors, a signal to at least one of a source device or base station indicating to stop sending excluded audio streams.

Example 37. The method of any combination of examples 27-36, further comprising combining, by the one or more processors, at least two of the subset of the plurality of audio streams.

Example 38. The method of example 37, wherein the combining the at least two of the subset of the plurality of audio streams is by at least one of mixing or interpolation.

Example 39. The method of any combination of examples 27-38, further comprising overriding, by the one or more processors, the level of authorization in the audio metadata.

Example 40. The method of example 39, further comprising outputting, by the one or more processors, the plurality of audio streams to one or more speakers based upon the level of authorization in the audio metadata being overridden.

Example 41. The method of any combination of examples 27-40, further comprising receiving the level of authorization from a source device.

Example 42. The method of any combination of examples 27-41, further comprising generating, by the one or more processors, the level of authorization.

Example 43. The method of any combination of examples 27-42, further comprising receiving a voice command from a microphone and controlling a display device based on the voice command.

Example 44. The method of any combination of examples 27-43, further comprising outputting the subset of the plurality of audio streams to one or more speakers.

Example 45. The method of any combination of examples 27-44, wherein the method is performed upon an extended reality headset, and wherein the acoustical space comprises a scene represented by video data captured by a camera.

Example 46. The method of any combination of examples 27-45, wherein the method is performed upon an extended reality headset, and wherein the acoustical space comprises a virtual world.

Example 47. The method of any combination of examples 27-46, wherein the method is performed upon a head-mounted device configured to present the acoustical space.

Example 48. The method of any combination of examples 27-47, wherein the method is performed upon a mobile handset.

Example 49. The method of any combination of examples 27-48, further comprising receiving a wireless signal.

Example 50. The method of example 49, wherein the wireless signal is Bluetooth.

Example 51. The method of example 49, wherein the wireless signal conforms to fifth generation (5G) cellular protocol.

Example 52. A device configured to play one or more of a plurality of audio streams, the device comprising: means for storing the plurality of audio streams and corresponding audio metadata including a level of authorization for each of the audio streams and, location information associated with coordinates of an acoustical space in which the corresponding one of the plurality of audio streams was captured; and means for selecting, based on the level of authorization in the audio metadata and the location information, a subset of the plurality of audio streams, the subset of the plurality of audio streams excluding at least one of the plurality of audio streams.

Example 53. The device of example 52, further comprising means for obtaining the location information.

Example 54. The device of example 53, wherein the obtaining the location information is by reading the location information from the memory.

Example 55. The device of example 53, wherein the obtaining the location information is by determining the location information and wherein excluded streams are associated with one or more privacy zones.

Example 56. The device of any combination of examples 52-55, further comprising means for outputting the subset of the plurality of audio streams to one or more speakers.

Example 57. The device of any combination of examples 52-56, further comprising means for changing a gain of one or more of audio streams within the subset of the plurality of audio streams based on the level of authorization in the audio metadata.

Example 58. The device of any combination of examples 52-57, further comprising means for determining a privacy zone based on the level of authorization in the audio metadata and the location information associated with the coordinates of the acoustical space.

Example 59. The device of example 58, wherein the determining the privacy zone is by obtaining the privacy zone.

Example 60. The device of any combination of examples 52-59, further comprising means for generating a privacy zone based on the level of authorization in the audio metadata and the location information associated with the coordinates of the acoustical space.

Example 61. The device of any combination of examples 52-60, further comprising means for sending a signal to at least one of a source device or base station indicating to stop sending excluded audio streams.

Example 62. The device of any combination of examples 52-61, further comprising means for combining at least two of the subset of the plurality of audio streams.

Example 63. The device of example 62, wherein the combining the at least two of the subset of the plurality of audio streams is by at least one of mixing or interpolation.

Example 64. The device of any combination of examples 52-63, further comprising means for overriding the level of authorization in the audio metadata.

Example 65. The device of example 64, further comprising means for outputting the plurality of audio streams to one or more speakers based upon the level of authorization in the audio metadata being overridden.

Example 66. The device of any combination of examples 52-65, further comprising means for receiving the level of authorization from a source device.

Example 67. The device of any combination of examples 52-66, further comprising means for generating the level of authorization.

Example 68. The device of example and combination of examples 52-67, further comprising means for receiving a voice command from a microphone and means for controlling a display device based on the voice command.

Example 69. The device of any combination of examples 52-68, further comprising means for outputting the subset of the plurality of audio streams to one or more speakers.

Example 70. The device of any combination of examples 52-69, wherein the device comprises an extended reality headset, and wherein the acoustical space comprises a scene represented by video data captured by a camera.

Example 71. The device of any combination of examples 52-70, wherein the device comprises an extended reality headset, and wherein the acoustical space comprises a virtual world.

Example 72. The device of any combination of examples 52-71, wherein the device comprises a head-mounted device configured to present the acoustical space.

Example 73. The device of any combination of examples 52-69, wherein the device comprises a mobile handset.

Example 74. The device of any combination of examples 52-73, further comprising means for receiving a wireless signal.

Example 75. The device of example 74, wherein the wireless signal is Bluetooth.

Example 76. The device of example 74, wherein the wireless signal conforms to fifth generation (5G) cellular protocol.

Example 77. A non-transitory computer-readable storage medium having stored thereon instructions that, when executed, cause one or more processors to: store the plurality of audio streams and corresponding audio metadata including a level of authorization for each of the audio streams and, location information associated with coordinates of an acoustical space in which the corresponding one of the plurality of audio streams was captured; select, based on the level of authorization in the audio metadata and the location information, a subset of the plurality of audio streams, the subset of the plurality of audio streams excluding at least one of the plurality of audio streams.

Example 78. The non-transitory computer-readable storage medium of example 77, wherein instructions, when executed, cause one or more processors to obtain the location information.

Example 79. The non-transitory computer-readable storage medium of example 78, wherein the one or more processors obtain the location information by reading the location information from the memory.

Example 80. The non-transitory computer-readable storage medium of example 78, wherein excluded streams are associated with one or more privacy zones and the one or more processors obtain the location information by determining the location information.

Example 81. The non-transitory computer-readable storage medium of any combination of examples 77-80, wherein the instructions, when executed, cause one or more processors to output the subset of the plurality of audio streams to one or more speakers.

Example 82. The non-transitory computer-readable storage medium of any combination of examples 77-81, wherein the instructions, when executed, cause one or more processors to change a gain of one or more audio streams in the subset of the plurality of audio streams based on the level of authorization in the audio metadata.

Example 83. The non-transitory computer-readable storage medium of any combination of examples 77-82, wherein the instructions, when executed, cause one or more processors to determine a privacy zone based on the level of authorization in the audio metadata and the location information associated with the coordinates of the acoustical space.

Example 84. The non-transitory computer-readable storage medium of example 83, wherein the instructions, when executed, cause one or more processors to determine the privacy zone by obtaining the privacy zone.

Example 85. The non-transitory computer-readable storage medium of any combination of examples 77-84, wherein the instructions, when executed, cause one or more processors to generate a privacy zone based on the level of authorization in the audio metadata and the location information associated with the coordinates of the acoustical space.

Example 86. The non-transitory computer-readable storage medium of any combination of examples 77-85, wherein the instructions, when executed, cause one or more processors to send a signal to at least one of a source device or base station indicating to stop sending excluded audio streams.

Example 87. The non-transitory computer-readable storage medium of any combination of examples 77-86, wherein the instructions, when executed, cause one or more processors to combine at least two of the subset of the plurality of audio streams.

Example 88. The non-transitory computer-readable storage medium of example 87, wherein the instructions, when executed, cause one or more processors to combine the at least two of the subset of the plurality of audio streams by at least one of mixing or interpolation.

Example 89. The non-transitory computer-readable storage medium of any combination of examples 77-88, wherein the instructions, when executed, cause one or more processors to override the level of authorization in the audio metadata.

Example 90. The non-transitory computer-readable storage medium of example 89, wherein the instructions, when executed, cause one or more processors to output the plurality of audio streams to one or more speakers based upon the level of authorization in the audio metadata being overridden.

Example 91. The non-transitory computer-readable storage medium of any combination of examples 77-90, wherein the level of authorization in the audio metadata is received from a source device.

Example 92. The non-transitory computer-readable storage medium of any combination of examples 77-91, wherein the instructions, when executed, cause one or more processors to generate the level of authorization in the audio metadata.

Example 93. The non-transitory computer-readable storage medium of any of examples 77-92, wherein the instructions, when executed, cause one or more processors to control a display device based on a voice command.

Example 94. The non-transitory computer-readable storage medium of any combination of examples 77-93, wherein the instructions, when executed, cause one or more processors to output the subset of the plurality of audio streams to one or more speakers.

Example 95. The non-transitory computer-readable storage medium of any combination of examples 77-95, wherein the acoustical space comprises a scene represented by video data captured by a camera.

Example 96. The non-transitory computer-readable storage medium of any combination of examples 77-95, wherein the acoustical space comprises a virtual world.

Example 97. The non-transitory computer-readable storage medium of any combination of examples 77-96, wherein the instructions, when executed, cause one or more processors to present the acoustical space on a head-mounted device.

Example 98. The non-transitory computer-readable storage medium of any combination of examples 77-96, wherein the instructions, when executed, cause one or more processors to present the acoustical space on a mobile handset.

Example 99. The non-transitory computer-readable storage medium of any combination of examples 77-98, wherein the instructions, when executed, cause one or more processors to receive a wireless signal.

Example 100. The non-transitory computer-readable storage medium of example 99, wherein the wireless signal is Bluetooth.

Example 101. The non-transitory computer-readable storage medium of example 99, wherein the wireless signal conforms to fifth generation (5G) cellular protocol.

Example 102. A device configured to play one or more of a plurality of audio streams originating from a source, the device comprising: a memory configured to store a plurality of contacts, the plurality of audio streams and corresponding audio metadata, and location information associated with coordinates of an acoustical space in which the corresponding one of the plurality of audio streams was captured; and one or more processors coupled to the memory, and configured to: determine whether the source is associated with one of the plurality of contacts; and when the source is not associated with one of the plurality of contacts, select, based on the location information, a subset of the plurality of audio streams, the subset of the plurality of audio streams excluding at least one of the plurality of audio streams.

Example 103. The device of example 102, wherein the one or more processors are further configured to obtain the location information.

Example 104. The device of any combination of examples 102-103, wherein the one or more processors are further configured to output the subset of the plurality of audio streams to one or more speakers.

Example 105. The device of any combination of examples 102-104, wherein the one or more processors are further configured to change a gain of the subset of the plurality of audio streams based on whether the source is associated with one of the plurality of contacts.

Example 106. The device of any combination of examples 102-105, wherein the one or more microprocessors are further configured to obtain a privacy zone.

Example 107. The device of any combination of examples 102-105, wherein the one or more microprocessors are further configured to determine a privacy zone based on whether the source is not associated with one of the plurality of contacts and the location information associated with the coordinates of the acoustical space.

Example 108. The device of any combination of examples 102-107, wherein the one or more microprocessors are further configured to generate a privacy zone based on whether the source is not associated with one of the plurality of contacts and the location information associated with the coordinates of the acoustical space.

Example 109. The device of any combination of examples 102-108, wherein the one or more microprocessors are further configured to send a signal to at least one of a source device or base station indicating to stop sending excluded audio streams.

Example 110. The device of any combination of examples 102-109, wherein the one or more processors are further configured to combine at least two of the subset of the plurality of audio streams.

Example 111. The device of example 110, wherein the one or more processors combine the at least two of the subset of the plurality of audio streams by at least one of mixing or interpolation.

Example 112. The device of any combination of examples 102-111, wherein the one or more microprocessors are further configured to send a signal to at least one of a source device or base station indicating to stop sending excluded audio streams.

Example 113. The device of any combination of examples 102-112, wherein the plurality of contacts comprise favorability rankings.

Example 114. The device of example 113, wherein the one of more processors are further configured to: determine whether the source device is associated with one of the plurality of contacts of at least a predetermined favorability ranking; and when the source is not associated with one of the plurality of contacts of at least the predetermined favorability rankings, select the subset of the plurality of audio streams.

Example 115. The device of any combination of examples 102-114, further comprising a display device.

Example 116. The device of any combination of examples 102-115, further comprising a microphone, wherein the one or more processors are further configured to receive a voice command from the microphone and control the display device based on the voice command.

Example 117. The device of any combination of examples 102-116, further comprising one or more speakers.

Example 118. The device of any combination of examples 102-117, wherein the device comprises an extended reality headset, and wherein the acoustical space comprises a scene represented by video data captured by a camera.

Example 119. The device of any combination of examples 102-117, wherein the device comprises an extended reality headset, and wherein the acoustical space comprises a virtual world.

Example 120. The device of any combination of examples 102-119, further comprising a head-mounted device configured to present the acoustical space.

Example 121. The device of any combination of examples 102-117, wherein the device comprises a mobile handset.

Example 122. The device of any combination of examples 102-121, further comprising a wireless transceiver, the wireless transceiver being coupled to the one or more processors and being configured to receive a wireless signal.

Example 123. The device of example 122, wherein the wireless signal is Bluetooth.

Example 124. The device of example 122, wherein the wireless signal conforms to fifth generation (5G) cellular protocol.

Example 125. A method of playing one or more of a plurality of audio streams originating from a source comprising: storing, by a memory, a plurality of contacts, the plurality of audio streams and corresponding audio metadata, and location information associated with coordinates of an acoustical space in which the corresponding one of the plurality of audio streams was captured; and determining whether the source is associated with one of the plurality of contacts; and when the source is not associated with one of the plurality of contacts, selecting, by the one or more processors and based on the location information, a subset of the plurality of audio streams, the subset of the plurality of audio streams excluding at least one of the plurality of audio streams.

Example 126. The method of example 125, further comprising obtaining, by the one or more processors, the location information.

Example 127. The method of any combination of examples 125-126, further comprising outputting, by the one or more processors, the subset of the plurality of audio streams to one or more speakers.

Example 128. The method of any combination of examples 125-127, further comprising changing, by the one or more processors, a gain of the subset of the plurality of audio streams based on whether the source is associated with one of the plurality of contacts.

Example 129. The method of any combination of examples 125-128, further comprising obtaining, by the one or more processors, a privacy zone.

Example 130. The method of any combination of examples 125-129, further comprising determining, by the one or more processors, a privacy zone based on whether the source is not associated with one of the plurality of contacts and the location information associated with the coordinates of the acoustical space.

Example 131. The method of any combination of examples 125-130, further comprising generating, by the one or more processors, a privacy zone based on whether the source is not associated with one of the plurality of contacts and the location information associated with the coordinates of the acoustical space.

Example 132. The method of any combination of examples 125-131, further comprising sending a signal to at least one of a source device or base station indicating to stop sending excluded audio streams.

Example 133. The method of any combination of examples 125-132, further comprising combining, by the one or more processors, at least two of the subset of the plurality of audio streams.

Example 134. The method of example 133, wherein the combining the at least two of the subset of the plurality of audio streams is by at least one of mixing or interpolation.

Example 135. The method of any combination of examples 125-134, further comprising sending, by the one or more processors, a signal to at least one of a source device or base station indicating to stop sending excluded audio streams.

Example 136. The method of any combination of examples 125-135, wherein the plurality of contacts comprise favorability rankings.

Example 137. The method of example 136, further comprising: determining, by the one or more processors, whether the source device is associated with one of the plurality of contacts of at least a predetermined favorability ranking; and when the source is not associated with one of the plurality of contacts of at least the predetermined favorability rankings, selecting the subset of the plurality of audio streams.

Example 138. The method of any combinations of examples 125-137, further comprising receiving a voice command from a microphone and controlling, by the one or more processors, a display device based on the voice command.

Example 139. The method of any combination of examples 125-138, further comprising outputting the subset of the plurality of audio streams to one or more speakers.

Example 140. The method of any combination of examples 125-139, wherein the acoustical space comprises a scene represented by video data captured by a camera.

Example 141. The method of any combination of examples 125-139, wherein the acoustical space comprises a virtual world.

Example 142. The method of any combination of examples 125-141, further comprising presenting the acoustical space upon a head-mounted device.

Example 143. The method of any combination of examples 125-139, wherein the method is performed on a mobile handset.

Example 144. The method of any combination of examples 125-143, further comprising receiving a wireless signal.

Example 145. The method of example 144, wherein the wireless signal is Bluetooth.

Example 146. The method of example 144, wherein the wireless signal conforms to fifth generation (5G) cellular protocol.

Example 147. A device configured to play one or more of a plurality of audio streams originating from a source, the device comprising: means for storing a plurality of contacts, the plurality of audio streams and corresponding audio metadata, and location information associated with coordinates of an acoustical space in which the corresponding one of the plurality of audio streams was captured; means for determining whether the source is associated with one of the plurality of contacts; and means for selecting, when the source is not associated with one of the plurality of contacts, based on the location information, a subset of the plurality of audio streams, the subset of the plurality of audio streams excluding at least one of the plurality of audio streams.

Example 148. The device of example 147, further comprising means for obtaining the location information.

Example 149. The device of any combination of examples 147-148, further comprising means for outputting the subset of the plurality of audio streams to one or more speakers.

Example 150. The device of any combination of examples 147-149, further comprising means for changing a gain of the subset of the plurality of audio streams based on whether the source is associated with one of the plurality of contacts.

Example 151. The device of any combination of examples 147-150, further comprising means for obtaining a privacy zone.

Example 152. The device of any combination of examples 147-151, further comprising means for determining a privacy zone based on whether the source is not associated with one of the plurality of contacts and the location information associated with the coordinates of the acoustical space.

Example 153. The device of any combination of examples 147-152, further comprising means for generating a privacy zone based on whether the source is not associated with one of the plurality of contacts and the location information associated with the coordinates of the acoustical space.

Example 154. The device of any combination of examples 147-153, further comprising means for sending a signal to at least one of a source device or base station indicating to stop sending excluded audio streams.

Example 155. The device of any combination of examples 147-154, further comprising means for combining at least two of the subset of the plurality of audio streams.

Example 156. The device of example 155, wherein the combining the at least two of the subset of the plurality of audio streams is by at least one of mixing or interpolation.

Example 157. The device of any combination of examples 147-156, further comprising means for sending a signal to at least one of a source device or base station indicating to stop sending excluded audio streams.

Example 158. The device of any combination of examples 147-157, wherein the plurality of contacts comprise favorability rankings.

Example 159. The device of example 158, further comprising: means for determining whether the source device is associated with one of the plurality of contacts of at least a predetermined favorability ranking; and when the source is not associated with one of the plurality of contacts of at least the predetermined favorability rankings, means for selecting the subset of the plurality of audio streams.

Example 160. The device of any combinations of examples 147-159, further comprising means for receiving a voice command from a microphone and means for controlling a display device based on the voice command.

Example 161. The device of any combination of examples 147-160, further comprising means for outputting the subset of the plurality of audio streams to one or more speakers.

Example 162. The device of any combination of examples 147-161, wherein the acoustical space comprises a scene represented by video data captured by a camera.

Example 163. The device of any combination of examples 147-161, wherein the acoustical space comprises a virtual world.

Example 164. The device of any combination of examples 147-163, further comprising means for presenting the acoustical space upon a head-mounted device.

Example 165. The device of any combination of examples 147-164, further comprising means for presenting the acoustical space on a mobile handset.

Example 166. The device of any combination of examples 147-165, further comprising means for receiving a wireless signal.

Example 167. The device of example 166, wherein the wireless signal is Bluetooth.

Example 168. The device of example 166, wherein the wireless signal conforms to fifth generation (5G) cellular protocol.

Example 169. A non-transitory computer-readable storage medium having stored thereon instructions that, when executed, cause one or more processors to: store a plurality of contacts, the plurality of audio streams and corresponding audio metadata, and location information associated with coordinates of an acoustical space in which the corresponding one of the plurality of audio streams was captured; determine whether the source is associated with one of the plurality of contacts; and when the source is not associated with one of the plurality of contacts, select, based on the location information, a subset of the plurality of audio streams, the subset of the plurality of audio streams excluding at least one of the plurality of audio streams.

Example 170. The non-transitory computer-readable storage medium of example 169, wherein the instructions, when executed, cause one or more processors to obtain the location information.

Example 171. The non-transitory computer-readable storage medium of any combination of examples 169-170, wherein the instructions, when executed, cause one or more processors to output the subset of the plurality of audio streams to one or more speakers.

Example 172. The non-transitory computer-readable storage medium of any combination of examples 169-171, wherein the instructions, when executed, cause one or more processors to change a gain of the subset of the plurality of audio streams based on whether the source is associated with one of the plurality of contacts.

Example 173. The non-transitory computer-readable storage medium of any combination of examples 169-172, wherein the instructions, when executed, cause one or more processors to obtain a privacy zone.

Example 174. The non-transitory computer-readable storage medium of any combination of examples 169-173, wherein the instructions, when executed, cause one or more processors to determine a privacy zone based on whether the source is not associated with one of the plurality of contacts and the location information associated with the coordinates of the acoustical space.

Example 175. The non-transitory computer-readable storage medium of any combination of examples 169-174, wherein the instructions, when executed, cause one or more processors to generate a privacy zone based on whether the source is not associated with one of the plurality of contacts and the location information associated with the coordinates of the acoustical space.

Example 176. The non-transitory computer-readable storage medium of any combination of examples 169-175, wherein the instructions, when executed, cause one or more processors to send a signal to at least one of a source device or base station indicating to stop sending excluded audio streams.

Example 177. The non-transitory computer-readable storage medium of any combination of examples 172-178, wherein the instructions, when executed, cause one or more processors to combine at least two of the subset of the plurality of audio streams.

Example 178. The non-transitory computer-readable storage medium of example 177, wherein the instructions, when executed, cause one or more processors to combine the at least two of the subset of the plurality of audio streams by at least one of mixing or interpolation.

Example 179. The non-transitory computer-readable storage medium of any combination of examples 169-178, wherein the instructions, when executed, cause one or more processors to send a signal to at least one of a source device or base station indicating to stop sending excluded audio streams.

Example 180. The non-transitory computer-readable storage medium of any combination of examples 169-179, wherein the plurality of contacts comprise favorability rankings.

Example 181. The non-transitory computer-readable storage medium of example 180, wherein the instructions, when executed, cause one or more processors to: determine whether the source device is associated with one of the plurality of contacts of at least a predetermined favorability ranking; and when the source is not associated with one of the plurality of contacts of at least the predetermined favorability rankings, select the subset of the plurality of audio streams.

Example 182. The non-transitory computer-readable storage medium of any combination of examples 169-181, wherein the instructions, when executed, cause one or more processors to control a display device based upon a voice command.

Example 183. The non-transitory computer-readable storage medium of any combination of examples 169-182, wherein the instructions, when executed, cause one or more processors to output the subset of the plurality of audio streams to one or more speakers.

Example 184. The non-transitory computer-readable storage medium of any combination of examples 169-183, wherein the acoustical space comprises a scene represented by video data captured by a camera.

Example 185. The non-transitory computer-readable storage medium of any combination of examples 169-183, wherein the acoustical space comprises a virtual world.

Example 186. The non-transitory computer-readable storage medium of any combination of examples 169-185, wherein the instructions, when executed, cause one or more processors to present the acoustical space on a head-mounted device.

Example 187. The non-transitory computer-readable storage medium of any combination of examples 169-186, wherein the instructions, when executed, cause one or more processors to present the acoustical space on a mobile handset.

Example 188. The non-transitory computer-readable storage medium of any combination of examples 169-187, wherein the instructions, when executed, cause one or more processors to receive a wireless signal.

Example 189. The non-transitory computer-readable storage medium of example 188, wherein the wireless signal is Bluetooth.

Example 190. The non-transitory computer-readable storage medium of example 188, wherein the wireless signal conforms to fifth generation (5G) cellular protocol.

Example 191. A device comprising: a memory configured to store a plurality of audio streams and an associated level of authorization for each of the audio streams; andone or more processors implemented in circuitry and communicatively coupled to the memory, and configured to: select, based on the associated levels of authorization, a subset of the plurality of audio streams, the subset of the plurality of audio streams excluding at least one of the plurality of audio streams.

Example 192. The device of example 191, wherein the memory is further configured to store location information associated with coordinates of an acoustical space in which a corresponding one of the plurality of audio streams was captured or synthesized.

Example 193. The device of example 192, wherein the device comprises an extended reality headset, and wherein the acoustical space comprises a scene represented by video data captured by a camera.

Example 194. The device of example 192, wherein the device comprises an extended reality headset, and wherein an acoustical space comprises a virtual world.

Example 195. The device of example 192, wherein the device comprises an extended reality headset, and wherein an acoustical space comprises a physical world.

Example 196. The device of example 192, wherein the selected subset of the plurality of audio streams is further based on the location information.

Example 197. The device of any combination of examples 191-196, wherein excluded streams are associated with one or more privacy zones.

Example 198. The device of any combination of examples 191-197, wherein the one or more processors are further configured to output the subset of the plurality of audio streams to one or more speakers or headphones.

Example 199. The device of any combination of examples 191-198, wherein the one or more processors are further configured to change a gain of one or more audio streams in the subset of the plurality of audio streams based on the associated levels of authorization.

Example 200. The device of any combination of examples 191-199, wherein the one or more processors are further configured to null excluded audio streams.

Example 201. The device of any combination of examples 191-200, wherein the one or more processors are further configured to send a signal to at least one of a source device or base station indicating to stop sending excluded audio streams.

Example 202. The device of any combination of examples 191-201, wherein the one or more processors are further configured to combine at least two of the subset of the plurality of audio streams by at least one of mixing or interpolation.

Example 203. The device of any combination of examples 191-202, wherein the one or more processors are further configured to: obtain, from a user, a request to override at least one level of authorization; and based on the request, add at least one of the excluded audio streams associated with the at least one level of authorization to the subset of the plurality of audio streams.

Example 204. The device of example 203, wherein the one or more processors are configured to: output the subset of the plurality of audio streams to one or more speakers or headphones based upon the addition of the at least one of the excluded audio streams to the subset of the plurality of audio streams.

Example 205. The device of any combination of examples 191-204, wherein a level of authorization is received from a source device.

Example 206. The device of any combination of examples 191-205, wherein the one or more processors are further configured to generate the associated levels of authorization.

Example 207. The device of any combination of examples 191-206, wherein the associated levels of authorization comprise ranks.

Example 208. The device of example 207, wherein the one or more processors select the subset of the plurality of audio streams by: comparing the rank of each of the plurality of audio streams to a rank of a user; and selecting the subset of the plurality of audio streams based on the comparison.

Example 209. The device of any combination of examples 191-208, wherein the memory is further configured to store plurality of contacts, and wherein the associated levels of authorization are based on the plurality of contacts.

Example 210. The device of example 209, wherein the one or more processors select the subset of the plurality of audio streams by: determining whether a source of one or more of the plurality of audio streams is associated with one or more of the plurality of contacts; and selecting the subset of the plurality of audio streams based on the comparison.

Example 211. The device of any combination of examples 209-210, wherein the plurality of contacts comprise favorability rankings, and wherein the one or more processors select the subset of the plurality of audio streams by: determining whether a source of one or more of the plurality of audio streams is associated with one or more of the plurality of contacts of at least a predetermined favorability ranking; and selecting the subset of the plurality of audio streams based on the comparison.

Example 212. The device of any combination of examples 191-211, wherein the device is a content consumer device and the content consumer device refrains from decoding an audio stream associated with a privacy zone when the privacy zone does not have an associated level of authority.

Example 213. The device of any combination of examples 191-212, wherein the device is a content consumer device and the subset of the plurality of audio streams comprise reproduced audio streams based on encoded information received in a bitstream that is decoded by the one or more processors.

Example 214. The device of any combination of examples 191-213, wherein the device is a source device and the plurality of audio streams are not encoded.

Example 215. The device of any combination of examples 191-214, wherein the one or more processors select the subset of the plurality of audio streams to exclude the at least one of the plurality of audio streams based on the at least one of the plurality of audio streams not being authorized for a user.

Example 216. The device of any combination of examples 191-215, wherein the associated levels of authorization are contained in metadata associated with each audio stream or are otherwise in a bitstream.

Example 217. The device of any combination of examples 191-216, further comprising a display device.

Example 218. The device of any combination of examples 191-217, further comprising a microphone, wherein the one or more processors are further configured to receive a voice command from the microphone and control a display device based on the voice command.

Example 219. The device of any combination of examples 191-218, further comprising one or more speakers.

Example 220. The device of any combination of examples 191-219, wherein the device comprises a mobile handset.

Example 221. The device of any combination of examples 191-220, further comprising a wireless transceiver, the wireless transceiver being coupled to the one or more processors and being configured to receive a wireless signal, wherein the wireless signal is one of Bluetooth, or Wi-Fi, or conforms to fifth generation (5G) cellular protocol.

Example 222. The device of any combination of examples 191-221, wherein the selection of a subset of the plurality of audio streams is based on a comparison of the associated levels of authorization and a level of authorization of the device or a user of the device.

Example 223. The device of any combination of examples 191-222, wherein the memory is further configured to store location information associated with coordinates of an acoustical space in which a corresponding one of the plurality of audio streams was captured or synthesized, and wherein the level of authorization for the one of the plurality of audio streams is determined based on the location information.

Example 224. The device of example 223, wherein a plurality of privacy zones are defined in the acoustical space, each privacy zone having an associated level of authorization, wherein the level of authorization for the one of the plurality of audio streams is determined based on the level of authorization of the privacy zone which contains the location at which the one of the plurality of audio streams was captured or synthesized.

Example 225. The device of example 224, wherein the level of authorization for the one of the plurality of audio streams equals the level of authorization of the privacy zone which contains the location at which the one of the plurality of audio streams was captured or synthesized.

Example 226. The device of any combination of examples 191-225, wherein the device is configured to: receive the plurality of audio streams and the associated level of authorization for each of the plurality of audio streams; and receive a level of authorization for a user of the device, wherein the one or more processors are configured to: select the subset of the plurality of audio streams by selecting those audio streams that have an associated level of authorization that is not greater than the received authorization level for the user of the device; and send the selected subset of the plurality of audio streams to an audible output device for audible output of the selected subset of the plurality of audio streams.

Example 227. A method comprising: storing, by a memory, a plurality of audio streams and an associated level of authorization for each of the audio streams; and selecting, by one or more processors and based on the associated levels of authorization, a subset of the plurality of audio streams, the subset of the plurality of audio streams excluding at least one of the plurality of audio streams.

Example 228. The method of example 227, further comprising storing, by the memory, location information associated with coordinates of an acoustical space in which a corresponding one of the plurality of audio streams was captured or synthesized.

Example 229. The method of example 228, wherein the method is performed upon an extended reality headset, and wherein the acoustical space comprises a scene represented by video data captured by a camera.

Example 230. The method of example 228, wherein the method is performed upon an extended reality headset, and wherein the acoustical space comprises a virtual world.

Example 231. The method of example 228, wherein the method is performed upon a head-mounted device configured to present the acoustical space.

Example 232. The method of any combination of examples 227-231, wherein the selected subset of the plurality of audio streams is further based on the location information.

Example 233. The method of any combination of examples 227-232, wherein excluded streams are associated with one or more privacy zones.

Example 234. The method of any combination of examples 227-233, further comprising outputting, by the one or more processors, the subset of the plurality of audio streams to one or more speakers or headphones.

Example 235. The method of any combination of examples 227-234, further comprising changing, by the one or more processors, a gain of one or more of audio streams within the subset of the plurality of audio streams based on the associated levels of authorization.

Example 236. The method of any combination of examples 227-235, further comprising nulling, by the one or more processors, the excluded audio streams.

Example 237. The method of any combination of examples 227-236, further comprising sending, by the one or more processors, a signal to at least one of a source device or base station indicating to stop sending excluded audio streams.

Example 238. The method of any combination of examples 227-237, further comprising combining, by the one or more processors, at least two of the subset of the plurality of audio streams is by at least one of mixing or interpolation.

Example 239. The method of any combination of examples 227-238, further comprising: obtaining, from a user, a request to override at least one level of authorization; and based on the request, adding, by the one or more processors, at least one of the excluded audio streams associated with the at least one level of authorization to the subset of the plurality of audio streams.

Example 240. The method of any combination of examples 227-239, further comprising outputting, by the one or more processors, the subset of the plurality of audio streams to one or more speakers or headphones based upon the addition of the at least one of the excluded audio streams to the subset of the plurality of audio streams.

Example 241. The method of any combination of examples 227-240, further comprising receiving a level of authorization from a source device.

Example 242. The method of any combination of examples 227-241, further comprising generating, by the one or more processors, a level of authorization.

Example 243. The method of any combination of examples 227-241, wherein the associated levels of authorization comprise ranks.

Example 244. The method of example 243, wherein the selecting the subset of the plurality of audio streams comprises: comparing, by the one or more processors, the rank of each of the plurality of audio streams to a rank of a user; and selecting, by the one or more processors, the subset of the plurality of audio streams based on the comparison.

Example 245. The method of any combination of examples 227-244, further comprising storing, by the memory, a plurality of contacts, and wherein associated levels of authorization are based on the plurality of contacts.

Example 246. The method of example 245, wherein the selecting the subset of the plurality of audio streams comprises: determining, by the one or more processors, whether a source of one or more of the plurality of audio streams is associated with one or more of the plurality of contacts; and selecting, by the one or more processors, the subset of the plurality of audio streams based on the comparison.

Example 247. The method of any combination of examples 245-246, wherein the plurality of contacts comprise favorability rankings, and wherein the selecting the subset of the plurality of audio streams comprises: determining, by the one or more processors, whether a source of one or more of the plurality of audio streams is associated with one or more of the plurality of contacts of at least a predetermined favorability ranking; and selecting, by the one or more processors, the subset of the plurality of audio streams based on the comparison.

Example 248. The method of any combination of examples 227-247, further comprising refraining from decoding an audio stream associated with a privacy zone when the privacy zone does not have an associated level of authority.

Example 249. The method of any combination of examples 227-248, wherein the subset of the plurality of audio streams comprise reproduced audio streams based on encoded information received in a bitstream that is decoded by the one or more processors.

Example 250. The method of any combination of examples 227-249, wherein the plurality of audio streams are not encoded.

Example 251. The method of any combination of examples 227-250, wherein the selecting the subset of the plurality of audio streams to exclude the at least one of the plurality of audio streams is based on the at least one of the plurality of audio streams not being authorized for a user.

Example 252. The method of any combination of examples 227-251, further comprising receiving a voice command from a microphone and controlling a display device based on the voice command.

Example 253. The method of any combination of examples 227-252, wherein the method is performed upon a mobile handset.

Example 254. The method of any combination of examples 227-253, further comprising receiving a wireless signal, wherein the wireless signal is one of Bluetooth, or Wi-Fi, or conforms to fifth generation (5G) cellular protocol.

Example 255. The method of any combination of examples 227-254, wherein the selection of a subset of the plurality of audio streams is based on a comparison of the associated levels of authorization and a level of authorization of the device or a user of the device.

Example 256. The method of any combination of examples 227-255, further comprising storing, by the memory, location information associated with coordinates of an acoustical space in which a corresponding one of the plurality of audio streams was captured or synthesized, wherein the level of authorization for the one of the plurality of audio streams is determined based on the location information.

Example 257. The method of example 256, wherein a plurality of privacy zones are defined in the acoustical space, each privacy zone having an associated level of authorization, wherein the level of authorization for the one of the plurality of audio streams is determined based on the level of authorization of the privacy zone which contains the location at which the one of the plurality of audio streams was captured or synthesized.

Example 258. The method of example 257, wherein the level of authorization for the one of the plurality of audio streams equals the level of authorization of the privacy zone which contains the location at which the one of the plurality of audio streams was captured or synthesized.

Example 259. The method of any combination of examples 227-258, further comprising: receiving, by the one or more processors, the plurality of audio streams and the associated level of authorization for each of the plurality of audio streams; receiving, by the one or more processors, a level of authorization for a user of the device, and sending, by the one or more processors, the selected subset of the plurality of audio streams to an audible output device for audible output of the selected subset of the plurality of audio streams, wherein the selecting the subset of the plurality of audio streams comprises selecting those audio streams that have an associated level of authorization that is not greater than the received authorization level for the user of the device.

Example 260. A device comprising: means for storing a plurality of audio streams and an associated level of authorization for each of the audio streams; and means for selecting, based on the associated levels of authorization, a subset of the plurality of audio streams, the subset of the plurality of audio streams excluding at least one of the plurality of audio streams.

Example 261. A non-transitory computer-readable storage medium having stored thereon instructions that, when executed, cause one or more processors to: store a plurality of audio streams and an associated level of authorization for each of the audio streams; and select, based on the associated levels of authorization, a subset of the plurality of audio streams, the subset of the plurality of audio streams excluding at least one of the plurality of audio streams.

It should be noted that the methods described herein describe possible implementations, and that the operations and the steps may be rearranged or otherwise modified and that other implementations are possible. Further, aspects from two or more of the methods may be combined.

In one or more examples, the functions described may be implemented in hardware, software, firmware, or any combination thereof. When implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, when instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A device comprising:
a memory configured to store a plurality of audio streams and an associated level of authorization for each of the plurality of audio streams; and
one or more processors implemented in circuitry and communicatively coupled to the memory, and configured to:
select, based on the associated levels of authorization, a subset of the plurality of audio streams, the subset of the plurality of audio streams excluding at least one of the plurality of audio streams,
wherein the associated levels of authorization comprise ranks, and wherein the one or more processors select the subset of the plurality of audio streams by:
comparing a respective rank of each of the plurality of audio streams to a rank of a user; and
selecting the subset of the plurality of audio streams based on the comparison.
2. The device of claim 1, wherein the memory is further configured to store location information associated with coordinates of an acoustical space in which a corresponding one of the plurality of audio streams was captured or synthesized.

3. The device of claim 2, wherein the device comprises an extended reality headset, and wherein the acoustical space comprises a scene represented by video data captured by a camera.

4. The device of claim 2, wherein the device comprises an extended reality headset, and wherein an acoustical space comprises a virtual world.

5. The device of claim 2, wherein the device comprises an extended reality headset, and wherein an acoustical space comprises a physical world.

6. The device of claim 2, wherein the selected subset of the plurality of audio streams is further based on the location information.

7. The device of claim 1, wherein excluded audio streams are associated with one or more privacy zones.

8. The device of claim 1, wherein the one or more processors are further configured to output the subset of the plurality of audio streams to one or more speakers or headphones.

9. The device of claim 1, wherein the one or more processors are further configured to change a gain of one or more audio streams in the subset of the plurality of audio streams based on the associated levels of authorization.

10. The device of claim 1, wherein the one or more processors are further configured to null excluded audio streams.

11. The device of claim 1, wherein the one or more processors are further configured to send a signal to at least one of a source device or base station indicating to the at least one of the source device or the base station to stop sending excluded audio streams to the device.

12. The device of claim 1, wherein the one or more processors are further configured to combine at least two of the subset of the plurality of audio streams by at least one of mixing or interpolation.

13. The device of claim 1, wherein the one or more processors are further configured to:
obtain, from a user, a request to override at least one level of authorization; and
based on the request, add at least one of the excluded audio streams associated with the at least one level of authorization to the subset of the plurality of audio streams.

14. The device of claim 13, wherein the one or more processors are configured to:
output the subset of the plurality of audio streams to one or more speakers or headphones based upon the addition of the at least one of the excluded audio streams to the subset of the plurality of audio streams.

15. The device of claim 1, wherein a level of authorization is received by the device from a source device.

16. The device of claim 1, wherein the one or more processors are further configured to generate the associated levels of authorization.

17. The device of claim 1, wherein the memory is further configured to store plurality of contacts, and wherein the associated levels of authorization are based on the plurality of contacts.

18. The device of claim 17, wherein the one or more processors select the subset of the plurality of audio streams by:
determining whether a source of one or more of the plurality of audio streams is associated with one or more of the plurality of contacts; and
selecting the subset of the plurality of audio streams based on the determination.

19. The device of claim 1, wherein the device is a content consumer device and the subset of the plurality of audio streams comprise reproduced audio streams based on encoded information received in a bitstream that is decoded by the one or more processors.

20. The device of claim 1, wherein the device is a source device and the plurality of audio streams are not encoded.

21. The device of claim 1, wherein the one or more processors select the subset of the plurality of audio streams to exclude the at least one of the plurality of audio streams based on the at least one of the plurality of audio streams not being authorized for a user.

22. The device of claim 1, wherein the associated levels of authorization are contained in metadata associated with each audio stream or are otherwise in a bitstream.

23. The device of claim 1, further comprising a display device.

24. The device of claim 1, further comprising a microphone, wherein the one or more processors are further configured to receive a voice command from the microphone and control a display device based on the voice command.

25. The device of claim 1, further comprising one or more speakers.

26. The device of claim 1, wherein the device comprises a mobile handset.

27. The device of claim 1, further comprising a wireless transceiver, the wireless transceiver being coupled to the one or more processors and being configured to receive a wireless signal, wherein the wireless signal is one of Bluetooth, or Wi-Fi, or conforms to fifth generation (5G) cellular protocol.

28. The device of claim 1, wherein the selection of a subset of the plurality of audio streams is based on a comparison of the associated levels of authorization and a level of authorization of the device or a user of the device.

29. The device of claim 1, wherein the memory is further configured to store location information associated with coordinates of an acoustical space in which a corresponding one of the plurality of audio streams was captured or synthesized, and wherein the level of authorization for the one of the plurality of audio streams is determined based on the location information.

30. A device comprising:
a memory configured to store a plurality of audio streams and an associated level of authorization for each of the plurality of audio streams, and a plurality of contacts and associated favorability rankings for each of the plurality of contacts; and
one or more processors implemented in circuitry and communicatively coupled to the memory, and configured to:
select, based on the associated levels of authorization, a subset of the plurality of audio streams, the subset of the plurality of audio streams excluding at least one of the plurality of audio streams,
wherein the one or more processors select the subset of the plurality of audio streams by:
determining whether a source of one or more of the plurality of audio streams is associated with one or more of the plurality of contacts of at least a predetermined favorability ranking; and
selecting the subset of the plurality of audio streams based on the determination.

31. A device comprising:
a memory configured to store a plurality of audio streams and an associated level of authorization for each of the plurality of audio streams; and
one or more processors implemented in circuitry and communicatively coupled to the memory, and configured to:
select, based on the associated levels of authorization, a subset of the plurality of audio streams, the subset of the plurality of audio streams excluding at least one of the plurality of audio streams wherein the device is a content consumer device and the content consumer device refrains from decoding an audio stream associated with a privacy zone when the privacy zone does not have an associated level of authority.

32. A device comprising:
a memory configured to store a plurality of audio streams and an associated level of authorization for each of the plurality of audio streams; and
one or more processors implemented in circuitry and communicatively coupled to the memory, and configured to:
select, based on the associated levels of authorization, a subset of the plurality of audio streams, the subset of the plurality of audio streams excluding at least one of the plurality of audio streams, wherein a plurality of privacy zones are defined in an acoustical space, each privacy zone having an associated level of authorization, wherein the level of authorization for one of the plurality of audio streams is determined based on the level of authorization of the privacy zone which contains a location at which the one of the plurality of audio streams was captured or synthesized.

33. The device of claim 32, wherein the level of authorization for one of the plurality of audio streams equals a level of authorization of a privacy zone which contains a location at which the one of the plurality of audio streams was captured or synthesized.

34. A device comprising:
a memory configured to store a plurality of audio streams and an associated level of authorization for each of the plurality of audio streams; and
one or more processors implemented in circuitry and communicatively coupled to the memory, and configured to:
receive the plurality of audio streams and the associated level of authorization for each of the plurality of audio streams; receive a level of authorization for a user of the device
select a subset of the plurality of audio streams, the subset of the plurality of audio streams excluding at least one of the plurality of audio streams,
by selecting those audio streams that have an associated level of authorization that is not greater than the received authorization level for the user of the device; and
send the selected subset of the plurality of audio streams to an audible output device for audible output of the selected subset of the plurality of audio streams.

* * * * *